(12) United States Patent
Sreeramoju et al.

(10) Patent No.: US 9,794,184 B2
(45) Date of Patent: *Oct. 17, 2017

(54) REDUCING NETWORK CONGESTION BY PREFERENTIALLY DROPPING PACKETS SENT BY HIGH-BANDWIDTH SOURCES

(71) Applicant: Nicira, Inc., Palo Alto, CA (US)

(72) Inventors: Akshay K. Sreeramoju, Hyderabad (IN); Madhusudhan Ravi, Milpitas, CA (US); Ricardo Koller, White Plains, NY (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,665

(22) Filed: Jan. 3, 2017

(65) Prior Publication Data
US 2017/0118130 A1   Apr. 27, 2017

Related U.S. Application Data

(63) Continuation of application No. 14/645,091, filed on Mar. 11, 2015, now Pat. No. 9,544,238.

(51) Int. Cl.
| | |
|---|---|
| *H04L 12/823* | (2013.01) |
| *H04L 12/801* | (2013.01) |
| *H04L 12/851* | (2013.01) |
| *H04L 12/26* | (2006.01) |

(52) U.S. Cl.
CPC .............. *H04L 47/32* (2013.01); *H04L 43/16* (2013.01); *H04L 47/11* (2013.01); *H04L 47/12* (2013.01); *H04L 47/2483* (2013.01)

(58) Field of Classification Search
None
See application file for complete search history.

(56) References Cited

U.S. PATENT DOCUMENTS

| | | | |
|---|---|---|---|
| 6,487,183 | B1 | 11/2002 | Lo et al. |
| 7,706,266 | B2 | 4/2010 | Plamondon |
| 9,544,238 | B2 * | 1/2017 | Sreeramoju ............. H04L 47/32 |
| 2004/0267897 | A1 | 12/2004 | Hill et al. |
| 2005/0050377 | A1 | 3/2005 | Chan et al. |
| 2006/0028999 | A1 | 2/2006 | Iakobashvili et al. |
| 2006/0104298 | A1 * | 5/2006 | McAlpine ............... H04L 47/10 |
| | | | 370/412 |

(Continued)

FOREIGN PATENT DOCUMENTS

JP   2005311863   11/2005

*Primary Examiner* — Brian Roberts
(74) *Attorney, Agent, or Firm* — Adeli LLP

(57) ABSTRACT

Some embodiments provide a method for reducing congestion in a network stack that includes a series of components that send data packets through the network stack to a network. At a first component of the network stack, the method receives a data packet from a second component of the network stack. The method identifies a usage indicator value for a flow to which the data packet belongs. The usage indicator value is based on a comparison of a size of the flow to a size of a queue for a third component of the network stack. The method determines whether to send the data packet based on a comparison of the usage indicator value to a threshold usage value. The method sends the data packet to a next component of the network stack only when the usage indicator value is less than the threshold usage value.

20 Claims, 17 Drawing Sheets

(56) References Cited

U.S. PATENT DOCUMENTS

| | | |
|---|---|---|
| 2006/0282895 A1 | 12/2006 | Rentzis et al. |
| 2007/0055789 A1 | 3/2007 | Claise et al. |
| 2007/0081454 A1 | 4/2007 | Bergamasco et al. |
| 2008/0291927 A1 | 11/2008 | Yong et al. |
| 2009/0207736 A1* | 8/2009 | Gong .................. H04L 45/123 370/238 |
| 2010/0131636 A1 | 5/2010 | Suri et al. |
| 2012/0207018 A1 | 8/2012 | Goldenberg et al. |
| 2012/0250512 A1* | 10/2012 | Jagadeeswaran ....... H04L 47/12 370/237 |
| 2012/0287791 A1 | 11/2012 | Xi et al. |
| 2013/0100816 A1* | 4/2013 | Bergamasco ....... H04L 43/0864 370/237 |
| 2013/0138830 A1 | 5/2013 | Fang |
| 2013/0204965 A1* | 8/2013 | Masputra ................ H04L 47/60 709/217 |
| 2014/0233370 A1 | 8/2014 | Khare et al. |
| 2015/0188820 A1* | 7/2015 | Anghel ................ H04L 47/115 370/235 |
| 2015/0381505 A1* | 12/2015 | Sundararaman ........ H04L 47/25 370/235 |
| 2016/0234122 A1* | 8/2016 | Srinivasan .............. H04L 47/24 |

* cited by examiner

REDUCING NETWORK CONGESTION BY PREFERENTIALLY DROPPING PACKETS SENT BY HIGH-BANDWIDTH SOURCES

CLAIM OF BENEFIT TO PRIOR APPLICATION

This application is a continuation application of U.S. patent application Ser. No. 14/645,091, filed Mar. 11, 2015, and now published as U.S. Patent Publication 2016/0269305. U.S. patent application Ser. No. 14/645,091, now published as U.S. Patent Publication 2016/0269305, is incorporated herein by reference.

BACKGROUND

Some current data centers and private enterprise networks run server virtualization software on compute nodes. These compute nodes generate large amounts of network traffic that includes traffic originating from the virtual machines, as well as infrastructure traffic. Infrastructure traffic is traffic that originates from the host machine layer rather than a particular virtual machine implemented on the host machine.

Currently some networks send traffic as individual packets of data. A data item larger than an individual packet is broken down into multiple packets, each packet is then sent over a network to a destination system (e.g., a computer or virtual machine). When the packets reach their destination, the data in the packets is reassembled to recreate the original data item. In current systems, a packet is not guaranteed to reach its destination. Therefore, for each packet successfully received, the destination system sends an acknowledgement message back to the source address of the packet. The acknowledgement message alerts the original sender that that packet has been received. When a source system sends a packet that is lost in transmission (e.g., the packet is sent to a malfunctioning or busy intermediate system), the destination system does not send an acknowledgement message for that packet. The sending system is set up under the assumption that an unacknowledged packet was lost in transmission. Accordingly, when a threshold amount of time passes after a packet is sent, without the sending system receiving an acknowledgement message, the sending system re-sends the packet. In some network systems the threshold time is based on the round trip time between the sending and receiving systems. That is, in some cases the allowable threshold is the time for the packet to travel from the source system to the destination system, plus the time for the acknowledgement message to be generated and travel back to the source system, plus some buffer time to account for reasonable delays.

When a source system and destination system are geographically distant, the round trip time could be hundreds or thousands of milliseconds. The round trip time is great enough that it would be very inefficient to send one packet, and then wait for acknowledgement of that packet before sending the next packet. Accordingly, many packets are sent while waiting for the acknowledgement message for the first packet to arrive. The sending of many packets while waiting for an acknowledgement message to arrive causes problems when part of the transmission path between the systems is congested. Various networking links between systems have a limited memory capacity and serve as part of the path for multiple source and destination systems. When the memory capacity of an intermediary system is full or too close to full, the intermediate system will start to drop packets or refuse new packets, in some cases causing other intermediate systems to drop packets. In some cases an intermediary system refusing packets causes a great enough delay that a source system re-sends the packets. The re-sent packets can further increase congestion, making the original problem worse.

In some networking systems, when a threshold number of acknowledgement messages are missed within a particular amount of time, the source system determines that there is congestion on the path the packets are taking. The source system then slows down the rate of packet transmission in order to allow the congestion to clear. However, when the round trip time (for packet and acknowledgement message) is long, many packets can be sent out before the source system recognizes that congestion is an issue. This causes inefficient retransmission of packets that will be stopped by congestion and/or make the congestion worse. The inefficiency is particularly great when the point of congestion is within the same host machine as the source system (e.g., the congestion is at one or more layers of a set of network transmission layers on a kernel of the host machine) and the destination machine is far away. That is, the traffic congestion is at the beginning of the transmission path, but the round trip time is long and therefore the threshold for determining that packets are being lost is correspondingly long. In such cases, it takes a long time to identify that there is congestion, and many packets are sent at a high rate during that time.

BRIEF SUMMARY

Some embodiments provide a congestion notification system for a computer virtualization networking stack. The computer virtualization networking stack of some embodiments is a series of software and/or hardware processes and/or components that send data in packets through the series of processes, ultimately to a network. Although the term "component" is used herein, one of ordinary skill in the art will understand that in some embodiments processes are used instead of components. In some embodiments, some or all of the components include queues for storing data packets until the data packet can be sent to the next component in the series. These queues have finite capacity for data packets. When a queue of a component is full, any additional data packets arriving at that component will be dropped. The packet sender will then have to resend the packets in order for the data in them to be received by the destination computer, machine, or virtual machine.

The congestion notification system of some embodiments sends messages from lower layer (e.g., closer to the network in the series of components) components to higher layer (e.g., closer to the packet sender) components. When the higher layer components receive the congestion notification messages, the higher layer components reduce the sending rate of packets (in some cases the rate is reduced to zero) to allow the lower layer components to lower congestion (i.e., create more space in their queues by sending more data packets through the series of components). In some embodiments, the higher layer components resume full speed sending of packets after a threshold time elapses without further notification of congestion. In other embodiments, the higher layer components resume full speed sending of packets after receiving a message indicating reduced congestion in the lower layer components.

In some embodiments, a congestion notification message is sent from a lower layer component (e.g., a physical network interface card (PNIC)) to a middle layer component (e.g., a virtual network interface card (VNIC)). When the middle layer component receives the congestion message, the middle layer component begins dropping packets received from a higher layer component (e.g., a TCP/IP stack module). In some embodiments, the higher layer component provides usage indicators to the middle layer component with each packet. The usage indicators of some embodiments identify what portion of a queue of the lower layer component is occupied by unacknowledged data from the same data flow as the accompanying packet. The middle layer component of some embodiments uses the usage indicator for each packet to determine whether to send the packet to the next component or drop the packet. In some embodiments, the middle layer component compares the indicated usage level to a threshold level, sends packets with indicated usage below that threshold, and drops packets with indicated usage above that threshold. In some embodiments, the threshold is a pre-set value (e.g., 0.3, 40%, etc.). In other embodiments, the threshold value is randomly generated for each packet. In such embodiments, some packets with a higher indicated usage (than some blocked packets) will be sent to the next component and some packets with a lower indicated usage (than some sent packets) will be dropped. However, in such embodiments, packets with higher indicated usage will be more likely to be dropped.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide early notification of congestion to a packet sender in order to allow the packet sender to reduce the rate at which it sends packets. By reducing the rate of sending packets earlier than would be possible in prior art systems, the present invention reduces wasted time and further congestion delays caused by additional packets and re-sent packets from the packet sender.

The congestion notification system of some embodiments sends congestion notification messages from lower layer components of a computer virtualization network stack to higher layer components of the stack. In response to the congestion messages, the higher layer components reduce the rate of sending packets to allow the congestion to clear. The congestion notification system of some embodiments is also described in U.S. patent application Ser. No. 14/320, 416, filed Jun. 30, 2014, now issued as U.S. Pat. No. 9,621,471, which is incorporated herein by reference.

Figure 1:
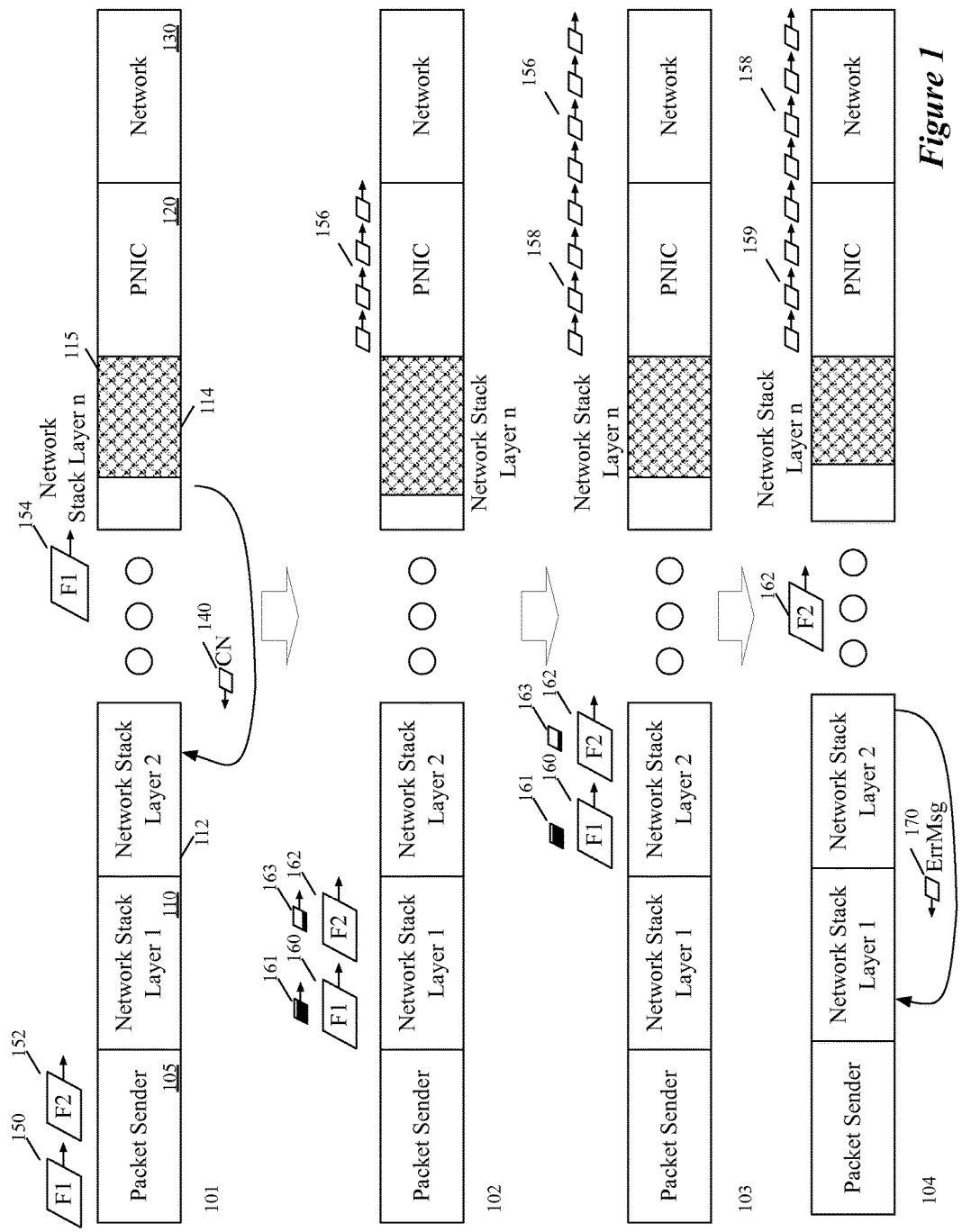
FIG. 1 conceptually illustrates a system of congestion notification in a multiple transmission layer host sending data to a network.

FIG. 1 conceptually illustrates a system of congestion notification in a multiple transmission layer host sending data to a network. The figure includes four stages 101-104, a packet sender 105, network stack layers 110, 112, and 114, congestion indicator 115, a physical network interface card (PNIC) 120, a network 130, congestion notification (CN) message 140, data segments 156, 158, and 159, data packets 160 and 162, usage indicators 161 and 163, and error message 170.

The packet sender 105 is a source of data to be sent over the network 130. The network stack layers 110-114 represent different processes on a host machine that each receive packets from the packet sender 105 (which may be one of many packet senders that generates and sends packets into the network stack) or a previous network stack layer, process the packets, and send the packets to the next network stack layer or the PNIC 120. As indicated by the ellipsis between layers 112 and 114, in some embodiments, additional network stack layers are provided. In some embodiments, the network stack layer 114 is provided by the PNIC 120 and provides a queue for data segments (e.g., segments of 1500 bytes) generated by splitting up larger data packets (e.g., data packets of 65 kB). In the illustrated embodiment, the PNIC 130 splits the packets into segments. However in other embodiments, a module of a previous network stack layer (e.g., a virtual network interface card (VNIC)) splits the packets into segments. In the illustrated embodiment of FIG. 1, only network stack layer 114 includes a queue to store segments before sending the segments to the network 130 through the PNIC 120. However, in other embodiments, other network stack layers also include queues to store packets and/or segments. If a new packet comes in to a particular network stack layer while the queue of that network stack layer is full, the network stack layer must drop the packet/segments or drop another packet to make room for the new packet/segments.

The congestion notification system is implemented by some embodiments in order to reduce the number of additional packets sent by the higher layer components (components of layers farther from the network) to the lower layer components (components of layers closer to the network) while the queues of the lower layer components are full (or nearly full). In stage 101, the queues of network stack layer 114 is nearly full, as indicated by congestion indicator 115. The congestion indicator 115 occupies a portion of network stack layer 114 proportional to the percentage of the queue that is occupied by segments waiting to be sent out. Additionally, data packet 154 arrives at network stack layer 114, further increasing the fullness of the queue.

Even though the queue is not entirely full, if the network stack layer 114 receives too many more packets before the congestion of the queues can be reduced (e.g., by sending segments to the network through PNIC 120) the queue will fill completely. When the queue fills completely, network stack layers 114 will start dropping packets. Additionally, in some cases, a large queue in layer 114 will cause unacceptable delays for applications that rely on small amounts of data to be sent with minimal delays, such as voice over Internet protocol (VOIP) applications, even when no segments are actually dropped.

To alert the process that manages network stack layer 112 (e.g., a module that implements a VNIC) to the status of the queue of layer 114 as fuller than a threshold percentage, in stage 101, the process that manages network stack layers 114 (or an intermediate layer between layers 112 and 114 in some embodiments) sends a CN message 140 to the process that manages network stack 110 (e.g., a module that implements a TCP/IP stack). The CN message 140 indicates a need to reduce the rate of sending packets.

Also in stage 101, the packet sender 105 sends out data in two flows (i.e., two different sets of IP source, IP destination, source port, destination port, and protocol values). In stage 101 the data in the flows are shown as data packets 150 and 152, respectively. However in some embodiments, the data in the flows are sent as streams of data from one or more packet senders and is not apportioned into packets until the data reaches a particular network stack layer such as layer 110 (e.g., a TCP/IP module).

In stage 102, the network stack layer 110 (in some embodiments a TCP/IP module) determines what portion of the queue of PNIC 120 is represented by the flow of each packet 150 and 152. The network stack layer sends the data of packets 150 and 152 on as packets 160 and 162, respectively. The network stack 110 sends out packets 160 and 162 accompanied by usage indicators 161 and 163, respectively. The usage indicators 161 and 163 indicate how high a portion of the PNIC queue is represented by unacknowledged packets previously sent in their respective flows. In some embodiments, unacknowledged packets, as described in greater detail below, are those packets which have been sent but for which an acknowledgment message has not been received and which have not been identified by the sender as lost. In stage 102, the PNIC 120 sends segments 156 out over the network 130, which reduces the queue in layer 114 below what it would have been with the addition of the data of packet 154. The PNIC similarly sends out segments 158 in stage 103 and 159 in stage 104.

In response to the CN message 140 (sent in stage 101), the network stack layer 112, in stage 103, reduces the rate of sending packets (in some embodiments the rate is reduced to zero in some circumstances). The layer 112 of some embodiments preferentially drops packets with a high PNIC queue usage (e.g., packets from flows that already occupy a large portion of the PNIC queue in layer 114). In the illustrated case, the unacknowledged data of the flow of packet 160 represents a high percentage of the PNIC queue size (as conceptually indicated by the high percentage of the packet's corresponding usage indicator 161 that is dark). In contrast, the unacknowledged data of the flow of packet 162 represents a low percentage of the PNIC queue size (as conceptually indicated by the low percentage of the packet's corresponding usage indicator 163 that is dark). Accordingly, in stage 104, the network stack layer 112 (e.g., a VNIC) drops packet 160 while sending packet 162 on toward the PNIC 120. The layer 112 also sends an error message 170 to network stack layer 110 (e.g., a TCP/IP module) to indicate that the packet 160 was dropped.

I. Network System

The congestion notification system of some embodiments is implemented to solve problems caused by sending data over long distances on a conventional IP network. When sending data over a long distance, there is a long delay between a point on the network becoming congested, and a sender of data packets determining that there is congestion on the network. During this long delay, the data packet sender sends out many more packets, worsening the congestion. In systems without congestion notification, the long delay occurs even when the congestion in the network is within the same host machine as the data packet sender.

Figure 2:
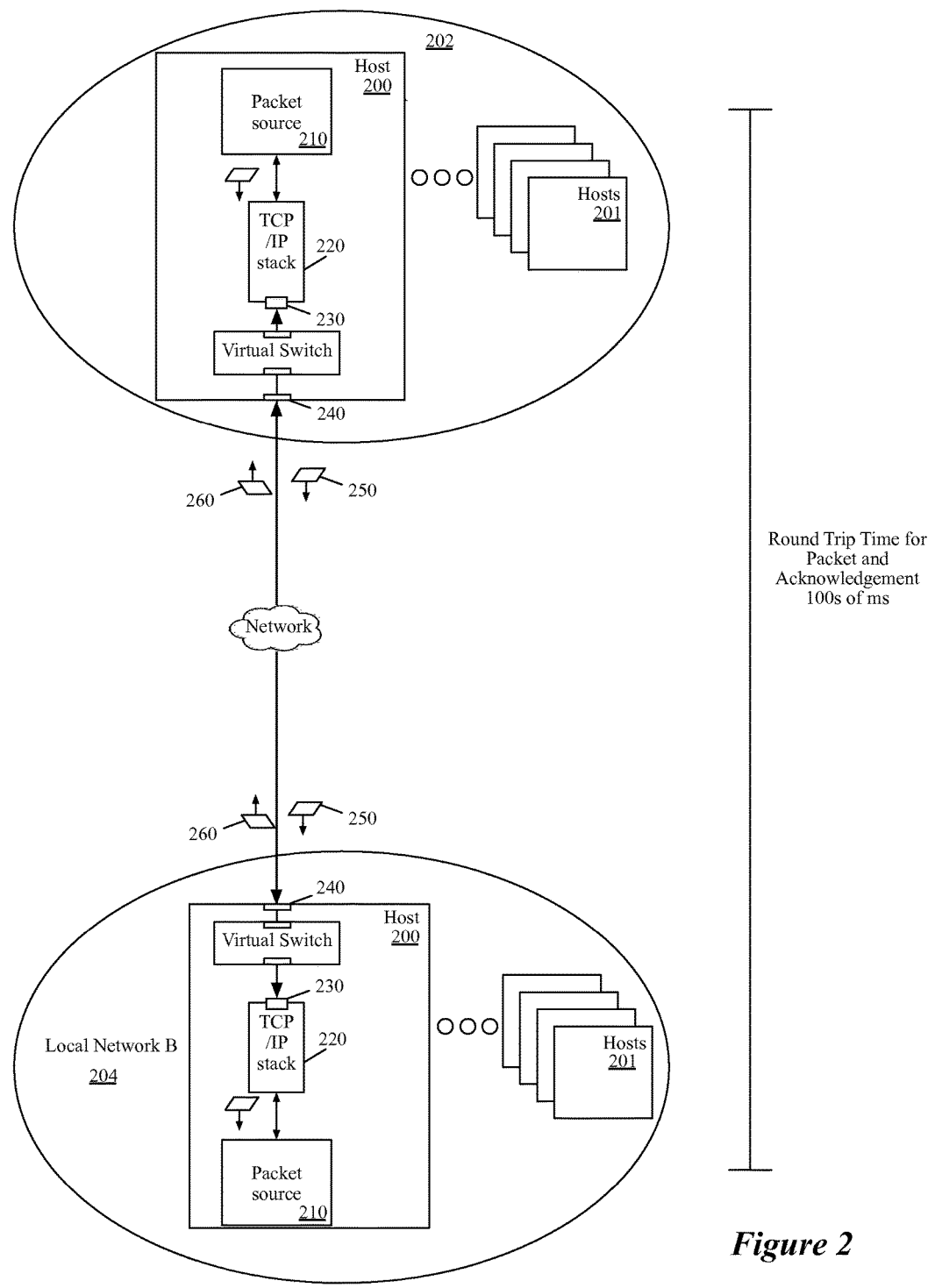
FIG. 2 illustrates a networked system in which the congestion notification system of some embodiments operates.

FIG. 2 illustrates a networked system in which the congestion notification system of some embodiments operates. The system includes hosts 200 and 201, local networks 202 and 204, packet sources 210, TCP/IP stacks 220, virtual switches 230, PNICs 240, packets 250, and acknowledgement messages 260.

The hosts 200 and 201 implement virtual machines (not shown). The packet sources 210 produce data to be sent from one host to another. The data is transferred as multiple packets 250 sent over a network. When the host machines are distant from each other, the round trip time (for a packet 250 and an acknowledgement message) can be hundreds of milliseconds. Because of the long round trip time, the expected time between sending a packet and receiving an acknowledgement message is correspondingly long. Therefore, the amount of time it takes to determine, from the absence of acknowledgement messages, that the connection is congested is also correspondingly long. In that time, many additional packets can be sent out, causing further congestion and being blocked. Furthermore, in some network systems, the higher the delay between the sender and the receiver, the higher the number of packets that the sender has to send without receiving acknowledgements in order for the sender (and/or other network components) to determine that the connection is congested.

Some embodiments provide a congestion notification system that works within a particular host 200 to allow network stack layers to identify and respond to local congestion quickly, resulting in less packet loss and less overall congestion. For example, in some embodiments, if there is congestion on a host 200 between a virtual switch 230 and a PNIC 240, the congestion notification system alerts the packet source 210, a module implementing the TCP/IP stack 220, or some other packet generating or transmitting element about the congestion. The element that receives the notification then reduces the transmission rate of the packets (e.g., by storing packets in its own buffer, dropping packets, etc. in the case of packet transmitters or not generating packets in the case of packet generators). The reduced transmission rate of packets allows the lower layer component to deal with the congestion before receiving too many additional packets.

This specification often refers to packets and packet headers, as with the packets 250. The term "packet" is used here as well as throughout this application to refer to a collection of bits in a particular format sent across a network. It should be understood that the term packet may be used herein to refer to various formatted collections of bits that may be sent across a network, such as Ethernet frames, TCP segments, UDP datagrams, IP packets, etc.

II. Host Machine

Figure 3:
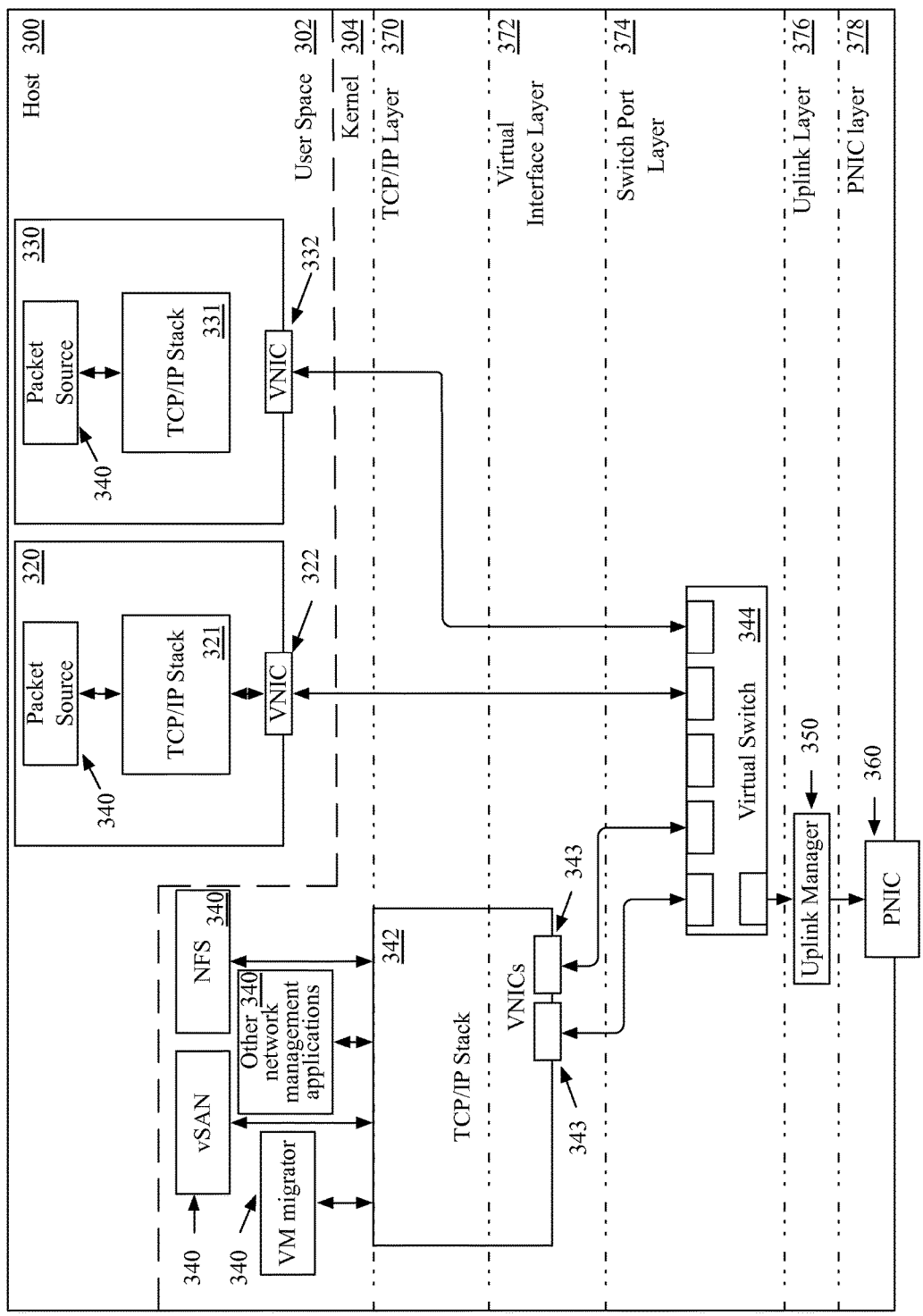
FIG. 3 illustrates a host computer with multiple network stack layers.

The congestion notification system of some embodiments is implemented on host machines of a data center or private enterprise networking system. FIG. 3 illustrates a host computer with multiple network stack layers. The figure shows a system in which the congestion notification system of some embodiments is implemented. The figure includes a host machine 300 that implements a user space 302 and a kernel 304. In the user space 302, the host 300 implements virtual machines 320 with virtual network interface cards (VNICs) 322. In the kernel 304, the host 300 implements multiple packet sources 340 (e.g., various network control processes), TCP/IP stack 342 with VNICs 343, virtual switch 344, and uplink manager 350. The host machine 300 includes a physical network interface card (PNIC) 360. The kernel 304 is conceptually divided into multiple layers 370-378 representing different processes or sets of processes that implement network stack layers. The virtual machines 320 of some embodiments also implement packet sources 340 (e.g., applications that send and receive data from machines accessible through a network).

Host machine 300 could be a host machine on a multi-tenant datacenter or a host machine on a single tenant enterprise network. The user space 302 and kernel 304 are divisions of the computing capabilities of the host machine 300 and may be implemented using different sets of application programming interfaces (APIs). Accordingly, processes running in the user space 302 may have different restrictions on them, and/or have access to different resources, than processes running in the kernel 304. The virtual machines 320 simulate separate computers. The virtual machines 320 can be virtual machines controlled by a single entity (e.g., a single tenant) or can be controlled by multiple entities (e.g., multiple tenants). The virtual network interface cards (VNICs) 322 are software constructs that the virtual machines 320 use to connect to a virtual switch 344 in the kernel 304 of the host 300.

TCP/IP stack 342 is a software construct that manipulates data received from various network processes 340, converting the data into IP packets that can be sent through the VNICs 343 to virtual switch 344, through the virtual and then out to a network (e.g., a public datacenter, an enterprise network, the Internet, etc.). Virtual switch 344 is a software construct that receives IP packets from within the host 300 and routes them toward their destinations (inside or outside the host 300). The virtual switch 344 also receives packets from outside the host 300 and routes them to their destinations in the host 300. The uplink manager 350 processes packets going from the virtual switch 344 to the PNIC 360. The uplink manager 350 stores the packets in an uplink queue until the PNIC 360 is available to send the packets out. The PNIC 360 is a hardware element that receives packets from within the host 300 that have destinations outside the host and forwards those packets toward their destinations over a network. The PNIC 360 also receives packets from outside the host (e.g., from a local network or an external network such as the Internet) and forwards those packets to the virtual switch 344 for distribution within the host 300.

The TCP/IP stack 342 is a stack of protocols that together translate data from the various processes 340 into IP packets that can be sent out on an IP network (e.g., the Internet). The TCP/IP stack 342 does not send the packets directly to their destinations. Instead, the TCP/IP stack sends the IP packets through the VNICs 343. The VNICs 343 store the packets in a virtual adapter dispatch queue until the virtual switch is ready to send the packets further. The virtual switch 344 is a "next hop" in the direction of the ultimate destination of the IP packets. The virtual switch 344 examines each IP packet individually to determine whether the destination of the packet is to a process running on the host 300 or to a process or machine outside of the host 300. When an IP packet is addressed to a destination on the host 300, the virtual switch 344 sends the IP packet to the destination process on the host 300. When an IP packet is addressed to a destination not on the host 300, the virtual switch forwards the IP packet to the uplink manager 350 to be queued for PNIC 360. The PNIC 360 sends the IP packet to a network (not shown) for further forwarding to its destination.

The kernel 304 is shown as conceptually divided into multiple layers 370-378. The layers 370-378 are not physical layers on the host 300, but are shown to represent the order in which data is sent from network process/packet source 340 to the PNIC 360. Layer 370 is a TCP/IP layer, including the TCP/IP stack that converts data from network process/packet source 340 into TCP/IP packets. In some embodiments, the TCP/IP stack 342 includes a TCP buffer for storing packets. Layer 372 is a virtual interface layer, including the VNICs 343 which provide a virtual adapter dispatch queue. Switch port layer 374 includes virtual switch 344. In some embodiments, virtual switch 344 sends packets from the VNICs to the uplink manager 350, but does not include a packet queue. In other embodiments, the virtual switch 344 does include a packet queue. Uplink layer 376 includes uplink manager 350. Uplink manager 360 in some embodiments includes an uplink queue. The PNIC layer 378 includes PNIC 360. In some embodiments, the PNIC 360 does not include a packet queue. In other embodiments, the PNIC 360 does include a packet queue.

In some embodiments, any layer that includes a queue can be a potential choke point where packets can be dropped when the queue is full. Accordingly, in some embodiments, processes included in any or all layers with a queue provide congestion notification messages. Although the layers are shown with a single component each in the network stack, in some embodiments a particular layer could include multiple components. For example, in some embodiments the switch packet layer, between the VNIC and the virtual switch could include multiple components such as firewalls, virus scanners, queue shaping applications, and/or any other applications associated with the networking software or by third parties, etc. Any or all of these components could include queues that can become congested. Such queues create multiple chokepoints between the VNIC and the virtual switch. Therefore, these components, in some embodiments, send congestion notification messages. Furthermore, in some embodiments, any or all of the additional components mentioned above are implemented between any other two identified layers (e.g., between the virtual switch and the uplink manager), instead of, or in addition to being implemented between the VNIC and the virtual switch.

III. Computer Virtualization Networking Stacks

Figure 4:
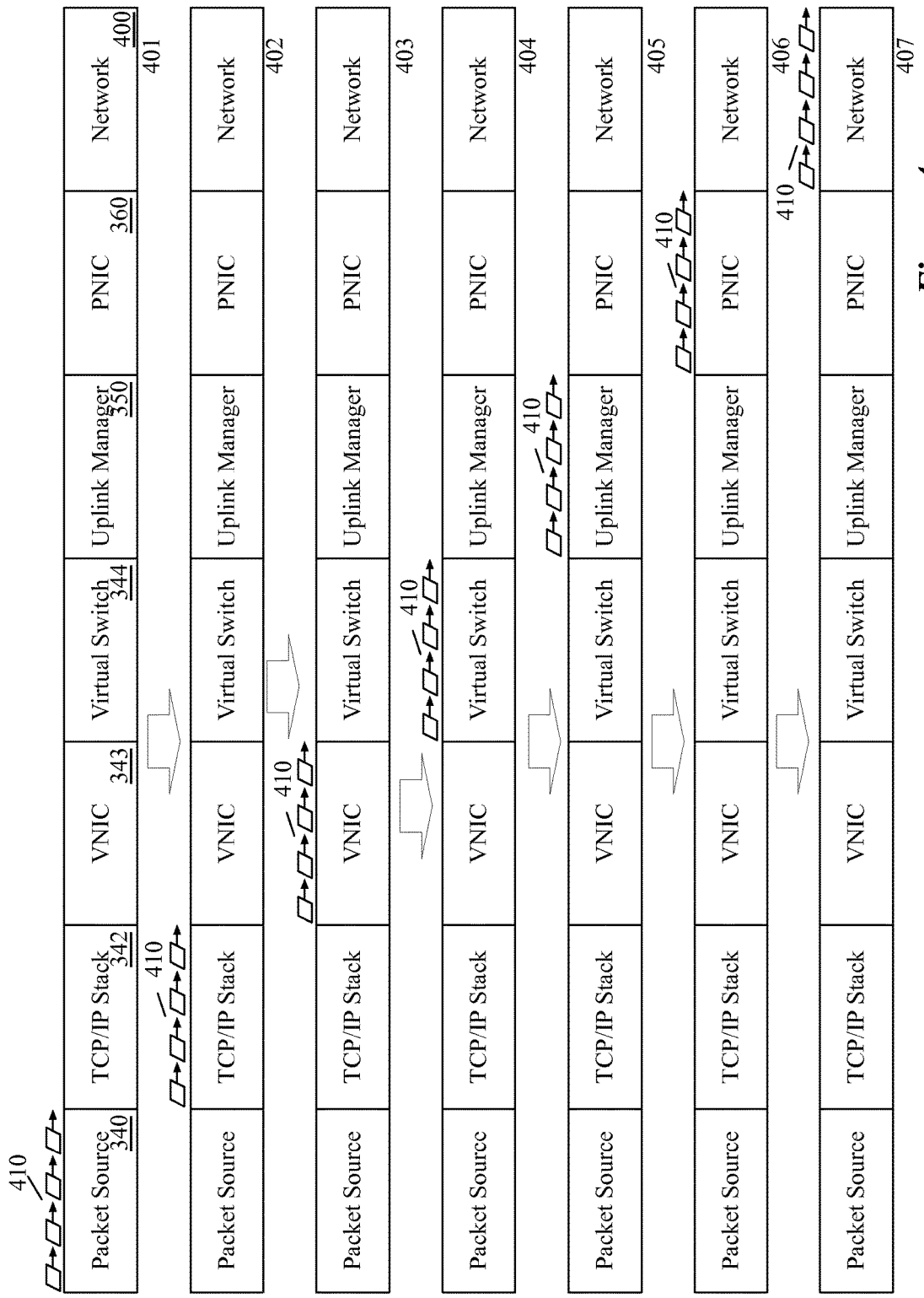
FIG. 4 illustrates a set of packets being sent through a computer virtualization networking stack of some embodiments.

The congestion notification system of some embodiments is implemented to allow congestion notification between multiple components in a series of components in a computer virtualization networking stack. In some embodiments some or all of the components of the computer virtualization networking stack are controlled by separate entities (e.g., separate computer processes, components, and/or hardware on a host). FIG. 4 illustrates a set of packets passing through a computer virtualization networking stack of some embodiments. In addition to various packet sending and transmitting elements from FIG. 3, FIG. 4 includes network 400 and packets 410 in stages 401-407. The figure shows the ideal progression of packets 410 under ideal conditions (with no congestion) from a data sending process/packet source 340 to a network 400. In FIG. 4, the bandwidth of each component 340, 342, 343, 344, 350, and 360, and network 400 is represented by the height of the component. Under ideal conditions, each component has the same bandwidth so none of the components becomes a bottleneck when packets are being sent. Because FIG. 4 illustrates a computer virtualization networking stack under ideal conditions, each component has the same bandwidth in this figure. However, in subsequent figures, with less ideal conditions, the bandwidths of the components, and the illustrated heights of the components in those figures, vary.

The packets start from the process/packet source 340 in stage 401. In some embodiments, the process 340 generates the packets, in other embodiments, the process 340 provides raw data to another process (e.g., the module implementing a TCP/IP stack) which divides the raw data into packets. The packets (or raw data) 410 are then transmitted to TCP/IP stack 342 in stage 402. The TCP/IP stack translates the data into TCP/IP packets. The packets 410 are then transmitted to VNIC 343 in stage 403. The packets 410 are then transmitted to virtual switch 344 in stage 404. The packets 410 are then transmitted to uplink manager 350 in stage 405. The packets 410 are transmitted to PNIC 360 in stage 406, and then sent out onto network 400 in stage 407.

FIG. 4 includes various specific components in a computer virtualization networking stack. However, one of ordinary skill in the art will understand that other embodiments may contain more, fewer, or different components. For example, some embodiments provide additional components (e.g., firewalls, virus scanners, queue managers, QOS filters, etc.) in the computer virtualization networking stack. For example, some embodiments, provide such additional components between a VNIC and a virtual switch.

Figure 5:
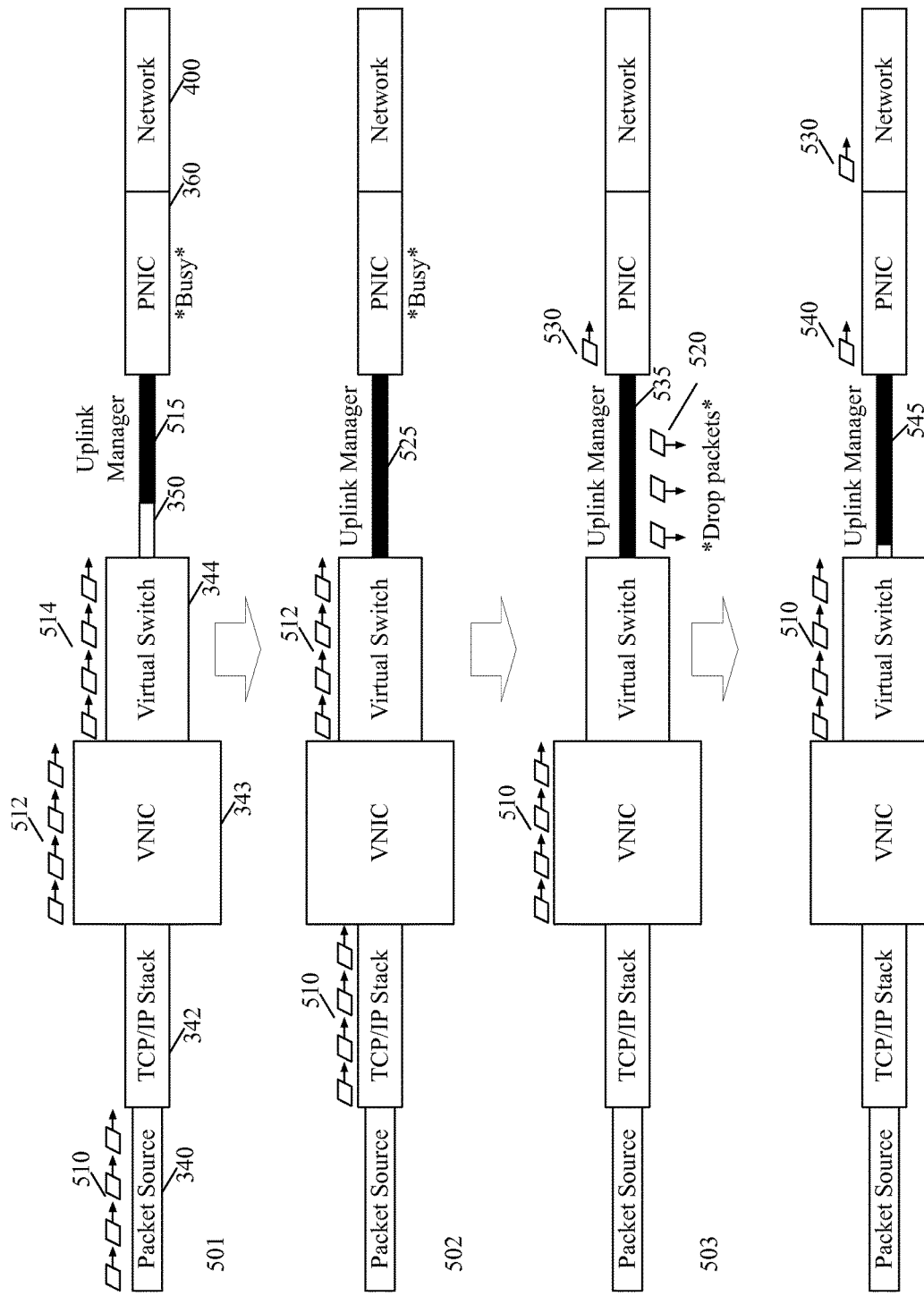
FIG. 5 illustrates the passage of a set of packets through a computer virtualization networking stack under less than ideal conditions, without a congestion notification system.

FIG. 5 illustrates the passage of a set of packets through a computer virtualization networking stack under less than ideal conditions, without a congestion notification system. The computer virtualization networking stack is shown in stages 501-504. The figure shows sets of packets 510, 512, and 514, dropped packets 520, and individual packets 530 and 540. The figure also shows congestion indicators 515, 525, 535, and 545. The computer virtualization networking stack of FIG. 5 has different bandwidths for different components. The bandwidth of each component is indicated by the height of the component (e.g., VNIC 343 has much more bandwidth than uplink manager 350).

In stage 501, packets 510 are being sent from packet source 340 to TCP/IP stack 342. Packets 512 are being sent from VNIC 343 to virtual switch 344. Packets 514 are being sent from virtual switch 344 to uplink manager 350. The uplink manager 350 already has packets in its uplink queue (as indicated by congestion indicator 515), but in this stage PNIC 360 is busy, so no packets can be sent from the uplink queue to the PNIC 360 by the uplink manager 350. In stage 501, the uplink queue of the uplink manager 350 is almost full, as indicated by congestion indicator 515. In this figure, congestion indicators occupy a portion of their corresponding component (in a given stage) that is proportional to how full the queue is during that stage.

In stage 502, packets 514 arrive at uplink manager 350. The packets 514 finish filling up the uplink queue of the uplink manager 350 (as indicated by congestion indicator 525, which covers the entire uplink manager 350). Meanwhile, packets 510 arrive at TCP/IP stack 342, ready to be sent to VNIC 343, Packets 512 arrive at the virtual switch 344, ready to be sent to uplink manager 350 (with its full uplink queue).

In stage 503, PNIC 360 is no longer busy, so uplink manager 350 sends an individual packet 530 from the uplink queue to PNIC 360. In the illustrated example, the uplink manager has only enough bandwidth to send one packet per stage to the PNIC 360. In the same stage 503, the packets 512 arrive at the uplink manager 350. Since only one packet 530 has left the uplink queue of the uplink manager 350, there is only enough room in the uplink queue for one of the 4 packets 512. Accordingly, one of the packets is stored in the uplink queue (leaving the uplink queue full again) and the uplink manager 350 drops the other three packets, represented as dropped packets 520. Additionally, packets 510 are transferred to VNIC 343, ready for transfer to virtual switch 344.

In stage 504, PNIC 360 is also not busy, so uplink manager 350 sends an individual packet 540 from the uplink queue to PNIC 360. Similarly, PNIC 360 sends individual packet 530 out to the network. As mentioned above, in the illustrated example, the uplink manager has only enough bandwidth to send one packet per stage to the PNIC 360. In the same stage 504, no packets arrive at the uplink manager 350, leaving the uplink queue with one packet's worth of space (as indicated by congestion indicator 545, which covers most of uplink manager 350). Additionally, packets 510 are transferred from VNIC 343 to virtual switch 344. In the next stage (not shown) the packets 510 will reach the uplink manager, overflowing the uplink queue again and forcing the uplink manager to again drop packets. With no congestion notification system in place, packets will be dropped from two groups of packets.

Figure 6:
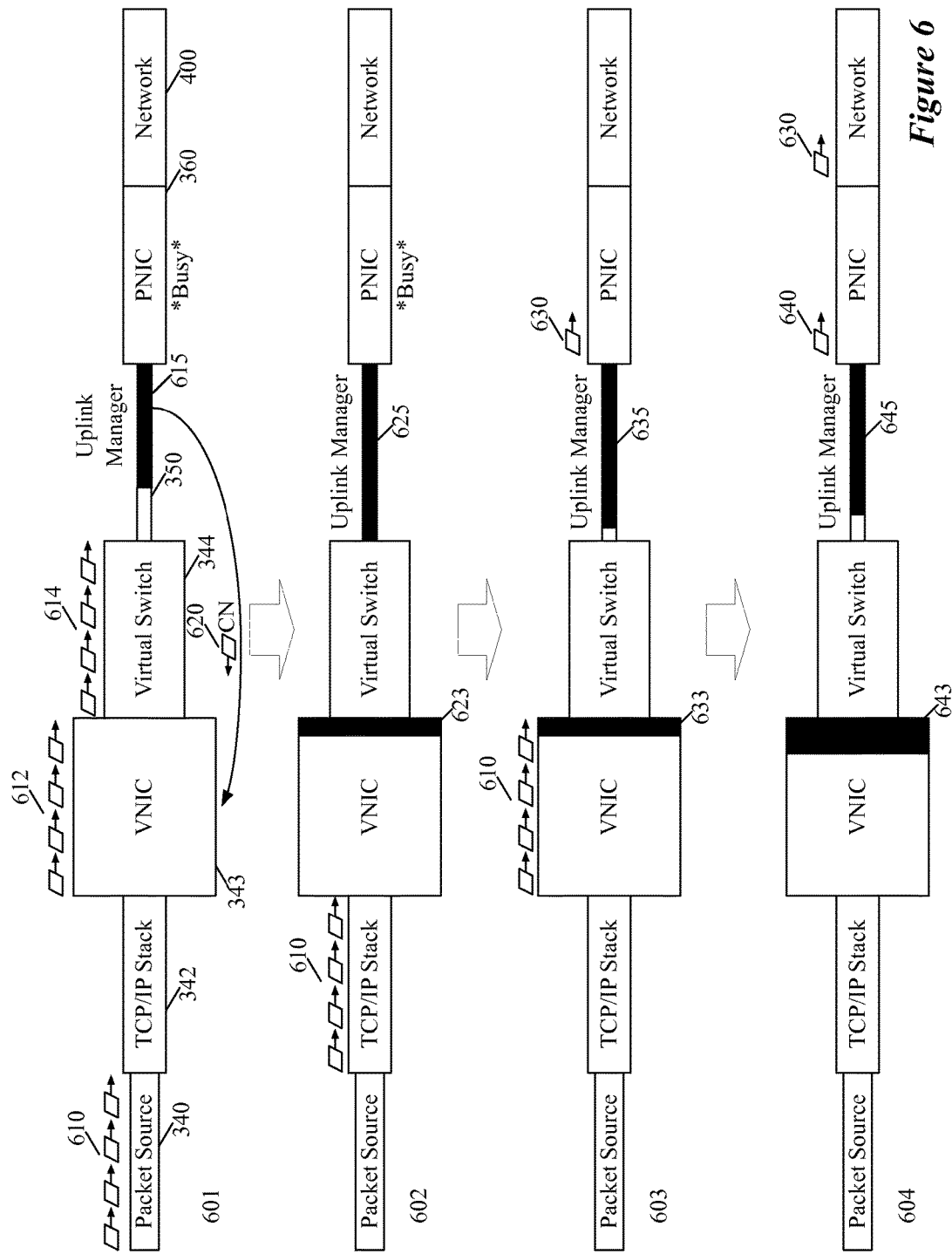
FIG. 6 illustrates the passage of a set of packets through a computer virtualization networking stack under less ideal conditions, with a congestion notification system.

FIG. 6 illustrates the passage of a set of packets through a computer virtualization networking stack under less ideal conditions, with a congestion notification system. The computer virtualization networking stack is shown in stages 601-604. The figure shows sets of packets 610, 612, and 614, congestion notification message 620, and individual packets 630 and 640. The figure also shows congestion indicators 615, 623, 625, 635, 643, and 645. The computer virtualization networking stack of FIG. 6 has different bandwidths for different components. The bandwidth of each component is indicated by the height of the component (e.g., VNIC 343 has much more bandwidth than uplink manager 350) and are the same as the bandwidths of the corresponding components in FIG. 5.

In stage 601, packets 610 are being sent from process/packet source 340 to TCP/IP stack 342. Packets 612 are about to be sent from VNIC 343 to virtual switch 344. Packets 614 are being sent from virtual switch 344 to uplink manager 350. The uplink manager 350 already has packets in its uplink queue (as indicated by congestion indicator 615), but in this stage PNIC 360 is busy, so no packets can be sent from the uplink queue to the PNIC 360 by the uplink manager 350. In stage 601, the uplink queue of the uplink manager 350 is almost full, as indicated by congestion indicator 615. In this figure, congestion indicators occupy a portion of their corresponding component (in a given stage) that is proportional to how full the queue is during that stage.

In contrast to the computer virtualization networking stack of FIG. 5, the computer virtualization networking stack of FIG. 6 implements a congestion notification system. As the uplink queue of uplink manager 350 is more than a threshold amount full, the uplink manager 350 sends a congestion notification message 620 to the VNIC 343. This message alerts the VNIC 343 to the congested status of the uplink queue. Although the uplink queue is not completely full when the congestion notification message 620 is sent, the message is sent in stage 601 because packets that are already past VNIC 343 (e.g., packets 614) could use up the rest of the space in the uplink queue of uplink manager 350.

In stage 602, the packets 614 arrive at uplink manager 350. The packets 614 finish filling up the uplink queue of the uplink manager 350 (as indicated by congestion indicator 625, which covers the entire uplink manager 350). Meanwhile, packets 610 arrive at TCP/IP stack 342, ready to be sent to VNIC 343. The VNIC 343, in response to the congestion notification message 620 has stored packets 612, rather than sending the packets to virtual switch 344 (as happened to packets 512 in FIG. 5). The storage of these packets in the VNIC queue of VNIC 344 is shown by congestion indicator 623. The results of storing these packets, rather than sending them to the virtual switch 344 are shown in stage 603. While the embodiment of FIG. 6 stores all the packets of packets 612, in some embodiments, some fraction of the packets (e.g., based on the bandwidth of the uplink manager 350) are sent while the rest are queued. For example, in some embodiments, the VNIC 343 would send as many packets per stage as the uplink manager 350 can send to the PNIC 360 (here, one packet per stage), when the PNIC is not busy.

In stage 603, PNIC 360 is no longer busy, so uplink manager 350 sends an individual packet 630 from the uplink queue to PNIC 360. In the illustrated example, the uplink manager has only enough bandwidth to send one packet per stage to the PNIC 360. In the same stage 603, the packets 612, having been stored in the VNIC queue of VNIC 343 (in stage 602), do not arrive at the uplink manager 350. As the packets 612 have not reached the uplink manager, the packets 612 do not overflow the uplink queue of the uplink manager 350 (as was the case with packets 512 in stage 503 of FIG. 5). Accordingly, no packets are dropped. Furthermore, the uplink queue is left with space for a packet, as indicated by congestion indicator 635, which covers most, but not all, of uplink manager 350.

Additionally, packets 610 are transferred to VNIC 343, ready for transfer to virtual switch 344. However, because of the previously received congestion notification message 620, the VNIC 343 will store the packets 610 in the VNIC queue rather than sending them to virtual switch 344 in stage 604. In stage 604, PNIC 360 is also not busy, so uplink manager 350 sends an individual packet 640 from the uplink queue to PNIC 360. Similarly, PNIC 360 sends individual packet 630 out to the network. As mentioned above, in the illustrated example, the uplink manager has only enough bandwidth to send one packet per stage to the PNIC 360. In the same stage 604, no packets arrive at the uplink manager 350, leaving the uplink queue with two packet's worth of space (as indicated by congestion indicator 645, which covers most of uplink manager 350). As mentioned above, packets 610 are not transferred from VNIC 343 to virtual switch 344. Therefore, in the next stage (not shown) no packets will reach the uplink manager. The uplink queue will not overflow and the uplink manager 350 will not have to drop any packets. With the congestion notification system in place, no packets are dropped from packets 610 and 612.

IV. Congestion Notification System Messages

Figure 7:
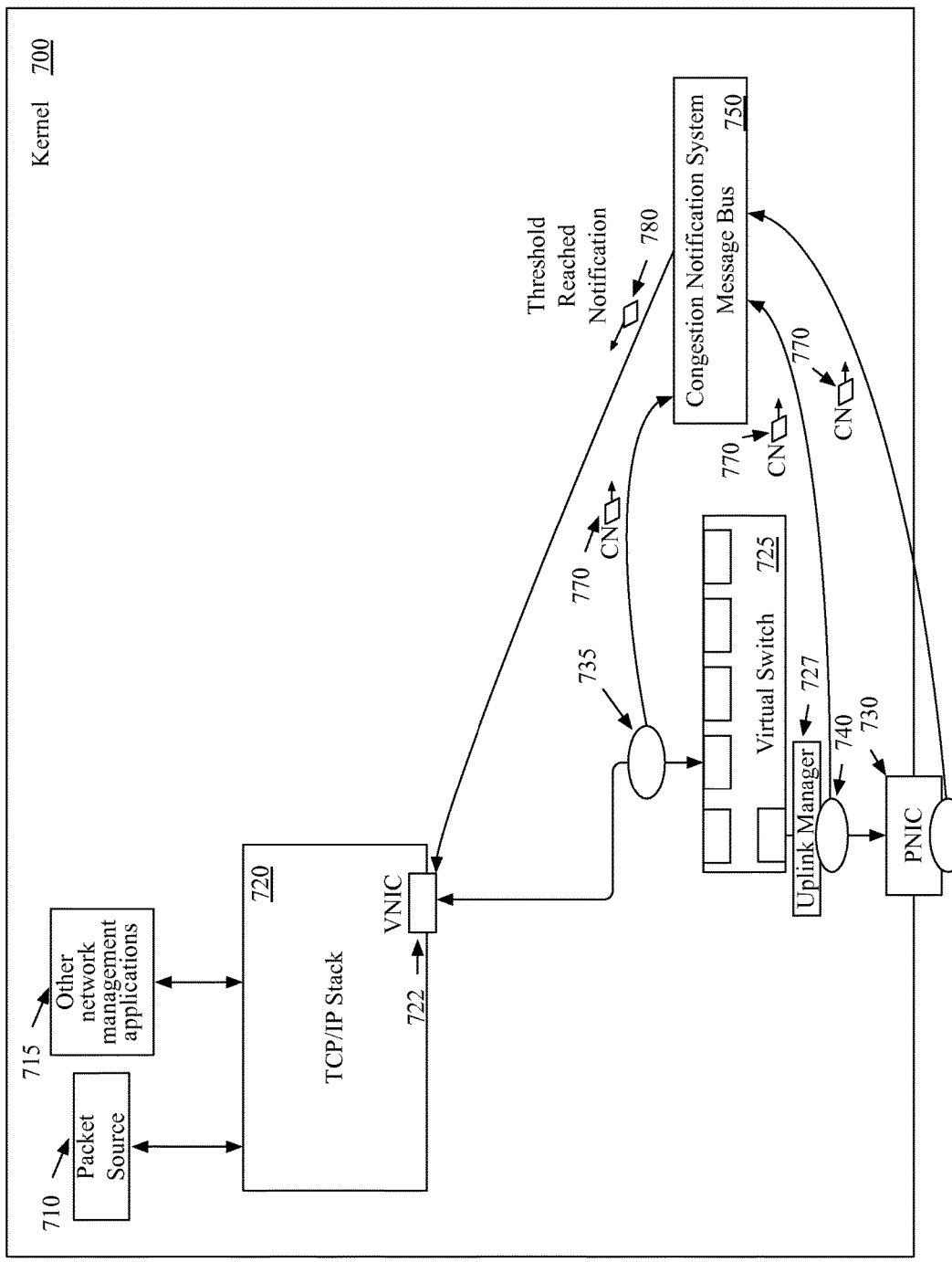
FIG. 7 illustrates a congestion notification system of some embodiments with multiple components that notify higher components about congestion.

The congestion notification system of FIG. 6 includes a single component (the uplink manager 350) that notifies a higher component about congestion, and a single component (the VNIC 343) that receives notifications about congestion. However, other embodiments provide multiple components that notify higher components about congestion and/or multiple components that receive notification about congestion. FIG. 7 illustrates a congestion notification system of some embodiments with multiple components that notify higher components about congestion. The figure includes kernel 700, packet source 710, other network management application 715, TCP/IP stack 720 with VNIC 722, virtual switch 725, uplink manager 727, PNIC 730, chokepoints 735, 740, and 745, congestion notification system message bus 750, congestion notification messages 770, and threshold reached notification messages 780.

The packet source 710 and other network management application 715 are network management processes running on kernel 700. These and other network management processes (not shown) produce data that is sent as packets through various computer virtualization networking stack processes, such as the TCP/IP stack 720, VNIC 722, virtual switch 725, and uplink manager 727. The data packets are then sent on to the PNIC 730 for transmission to a network (not shown). The computer virtualization networking stack processes of some embodiments include multiple chokepoints. In the embodiment of FIG. 7, there are three chokepoints 735, 740, and 745. Each chokepoint represents a packet queue administered by a component of the computer virtualization networking stack processes. The packet queues are used to store packets until the packets can be sent to the next component in the stack. For example, chokepoint 740 conceptually illustrates an uplink queue implemented by uplink manager 727. In some embodiments, each component in the computer virtualization networking stack has a queue. In other embodiments, some components have a queue and other components do not.

In the illustrated embodiment, the VNIC 722 is the sole component that receives notification of congestion further down the computer virtualization networking stack. In some embodiments, the component responsible for a queue notifies the VNIC 722 when congestion reaches a threshold level. That is, when the queue is a threshold percentage full. In some embodiments, each queue has an independent threshold setting. For example, in some embodiments a first threshold level could be set for the queue represented by chokepoint 740 (e.g., a threshold at 90%), a second threshold could be set for the queue represented by chokepoint 745 (e.g., a threshold at 70%), etc. In some embodiments, there is a default threshold setting for each chokepoint. In some such embodiments, the default thresholds for the chokepoints can be overridden by configuration of the component managing the queue.

When the queue of a particular component reaches the threshold fullness, the component sends a congestion notification message 770 to the higher layer component (here, VNIC 722) through a congestion notification system message bus 750. The congestion notification message 770 of some embodiments includes more data than the fact that the threshold has been reached. For example, the congestion notification message 770 of some embodiments includes the actual percentage of congestion (e.g., if the threshold level is 70%, but the queue is actually 85% full, the congestion notification message 770 will indicate that the congestion level is 85%).

The congestion notification message 770 of some embodiments includes the source of the packets (e.g., the source IP address and/or MAC address of the packet) that are congesting the queue. In some embodiments, the identified source is the source of the last packet to enter the queue. In some embodiments, the identified source is source of the last packet received before the congestion message is sent (e.g., the top packet in the queue or the last dropped packet). In other embodiments, the identified source is based on a most common source of a sampling of packets (e.g., a fraction or all of the packets) in the queue. In some embodiments, by the congestion notification system identifying the source of the congestion, the higher component can selectively reduce the rate of sending packets only of those slow down packets from the source of the congestion, without reducing the rates of sending packets from other sources. In some embodiments, the congestion notification messages 770 include other data relating to one or more packets in the queue (e.g., the destination, size, a hash of the contents, etc.). In some embodiments, when the packets are TCP packets, the congestion notification messages include TCP flow information (e.g., source address, destination address, source port, and destination port, protocol in use, a hash of the data in the message, etc.).

The congestion notification message 770 is then sent to the higher component (e.g., VNIC 722) as a threshold reached notification message 780. In some embodiments the threshold reached notification message 780 is a copy of the congestion notification message 770. In other embodiments, the threshold reached notification message 780 is a summary or an aggregate of congestion notification messages. In some embodiments, the threshold reached notifications for a particular chokepoint are sent only to components that subscribe to the message bus to receive congestion notifications about that particular chokepoint. In some embodiments a component subscribes by sending a subscription message for a chokepoint to a congestion notification system message bus. In other embodiments, a component is subscribed by its configuration (e.g., the subscription, or non-subscription, for each chokepoint is set in a configuration setting of the subscribing component).

Figure 8:
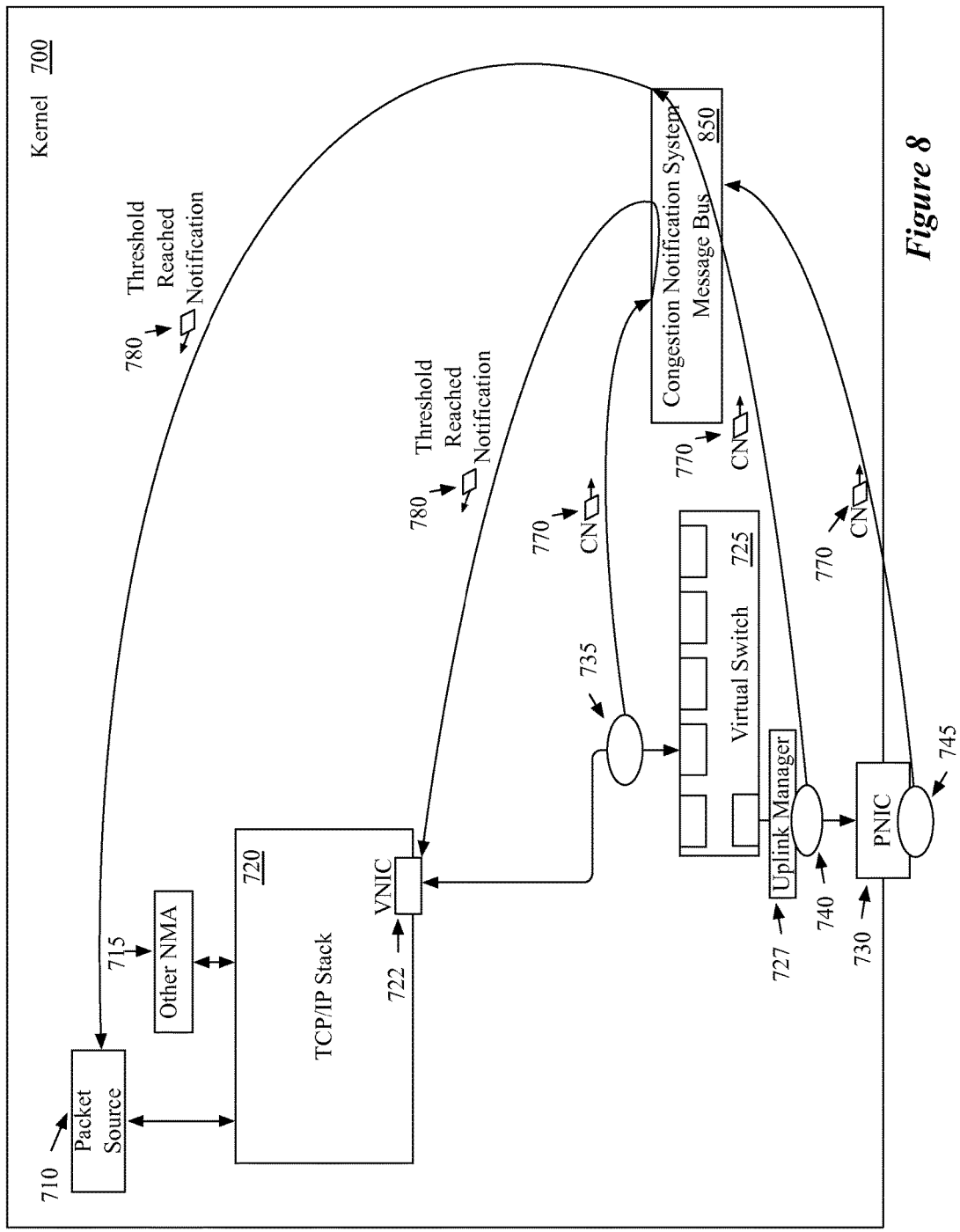
FIG. 8 illustrates a congestion notification system of some embodiments in which multiple components are notified of congestion.

FIG. 8 illustrates a congestion notification system of some embodiments in which multiple components are notified of congestion. The figure includes the same components and processes as FIG. 7, with congestion notification system message bus 750 replaced with congestion notification system message bus 850. The congestion notification system message bus 850 of this embodiment sends threshold reached notifications to multiple higher components. In FIG. 8, both the VNIC 722 and the packet source 710 receive notifications of congestion.

This figure also illustrates that in some embodiments that provide congestion notification options, not all chokepoints have to be monitored. Furthermore, different chokepoints can be monitored to send congestion notifications to different higher components. Here, packet source 710 is subscribed to receive congestion notifications about chokepoint 740 (e.g., from the uplink manager 727 through the message bus 850). Because the packet source 710 is not subscribed to receive notification about any other chokepoints, the only threshold reached notification messages 780 that the packet source 710 will receive identify congestion at the queue of the uplink manager 727 (i.e., chokepoint 740). The VNIC 722 is subscribed to receive congestion notifications about chokepoint 735. Because the VNIC 722 is not subscribed to receive notification about any other chokepoint, the only threshold reached notification messages 780 that the VNIC 722 will receive identify congestion at a queue of the virtual switch 725.

In addition to the chokepoints monitored for congestion in this figure, the PNIC 730 sends congestion notification messages 770 when its queue (represented by chokepoint 745) is above its threshold value. However, the congestion notification messages are not sent from the congestion notification system message bus 850 to any higher layer components because no higher layer components are subscribed to monitor congestion of the chokepoint 745. In some such embodiments, the congestion notification system message bus then discards the congestion messages from that chokepoint. In alternate embodiments, the component managing the queue of the chokepoint does not send congestion messages to a congestion notification system message bus when no higher layer component is monitoring the congestion at that chokepoint. In some embodiments, the congestion notification message includes an indicator of which higher component should receive the congestion notification message.

In some embodiments, each queue has multiple independent threshold settings (e.g., one for each higher component receiving congestion notifications). In the embodiment of FIG. 8, the packet source 710 and VNIC 722 subscribe to receive configuration notification messages about separate queues. However, in some embodiments each queue can be independently monitored by each higher component. For example, the packet source 710 could subscribe to be notified when the uplink queue represented by chokepoint 740 is above its threshold while the VNIC 722 could also subscribe to be notified when the uplink queue represented by chokepoint 740 is above its threshold.

As described with respect to FIG. 7, when the queue of a particular component reaches the threshold fullness, the component sends a congestion notification message 770 to the higher layer component (here, VNIC 722 and packet source 710) through a congestion notification system message bus 850. The congestion notification message 770 of some embodiments includes more data than the fact that the threshold has been reached. For example, the congestion notification message 770 of some embodiments includes the actual percentage of congestion (e.g., if the threshold level is 70%, but the queue is actually 85% full, the congestion notification message 770 will indicate that the congestion level is 85%). The congestion notification message 770 of some embodiments includes the source of the packets (e.g., the source IP address and/or MAC address of the packet) that are congesting the queue. In some embodiments, the identified source is the last packet to enter the queue. In other embodiments, the identified source is based on a most common source of a sampling of packets (e.g., a fraction or all of the packets) in the queue. In some embodiments, by the congestion notification system identifying the source of the congestion, the higher component can selectively reduce the rate of sending packets only of those slow down packets from the source of the congestion, without reducing the rates of sending packets from other sources. In some embodiments, the congestion notification messages 770 include other data relating to one or more packets in the queue (e.g., the destination, size, a hash of the contents, etc.).

Figure 9:
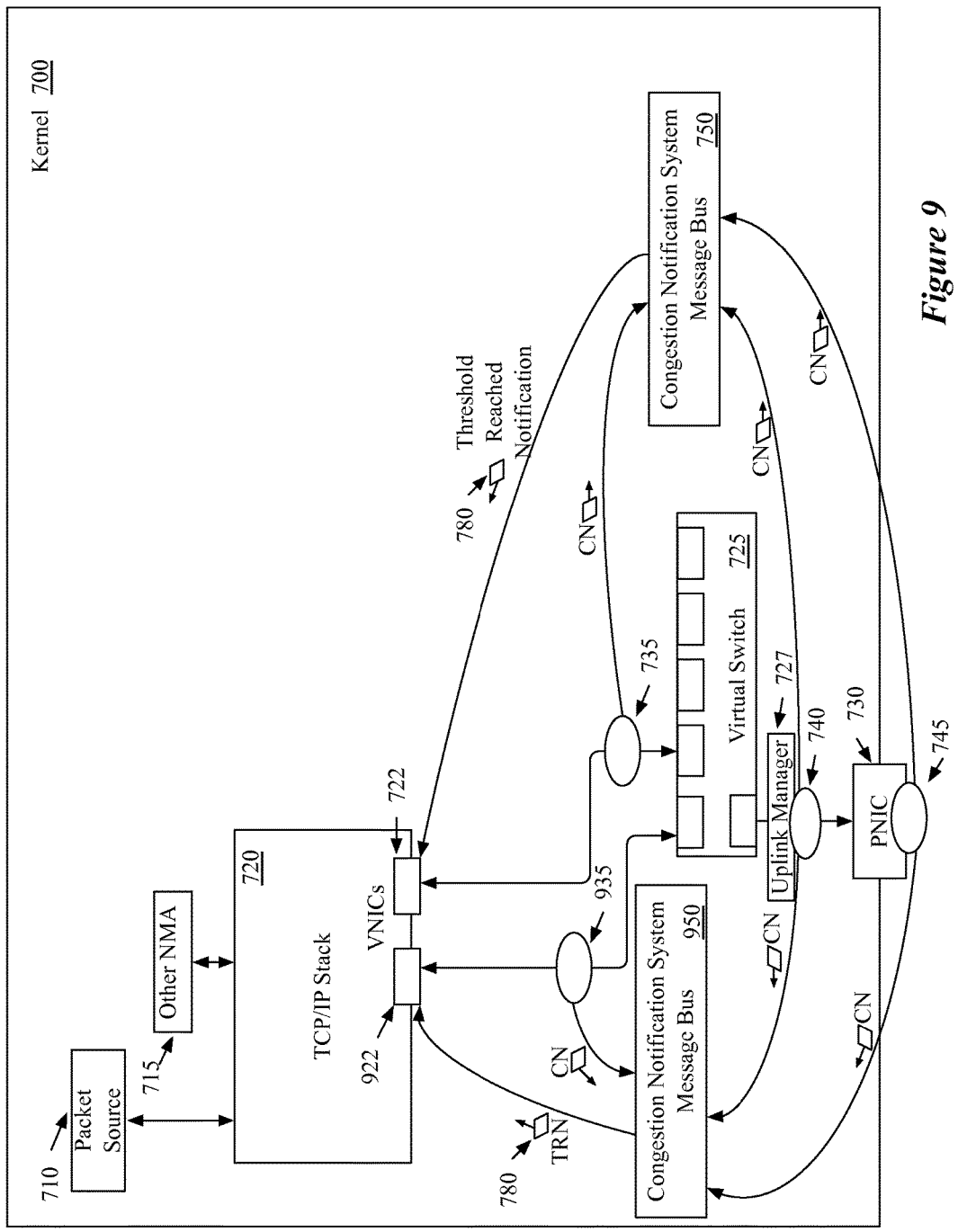
FIG. 9 illustrates a congestion notification system of some embodiments in which multiple VNICs are notified of congestion through multiple congestion notification system message buses.

Some embodiments provide a separate congestion notification system message bus for each higher component to be notified of congestion. For example, some embodiments provide a separate congestion notification system message bus for each of multiple VNICs on a TCP/IP stack of a kernel. FIG. 9 illustrates a congestion notification system of some embodiments in which multiple VNICs are notified of congestion through multiple congestion notification system message buses. The figure includes the same components and processes as FIG. 7, with the addition of a second VNIC 922, chokepoint 935, and congestion notification system message bus 950. The congestion notification system message bus 950 of this embodiment sends threshold reached notifications 780 to the second VNIC 922. In FIG. 9, both the VNICs 722 and 922 receive notifications of congestion.

In this figure, VNIC 922 is subscribed to receive congestion notifications about chokepoints 935 (actually to the virtual switch that manages the queue represented by chokepoint 935), 740, and 745. Accordingly, the VNIC 922 receives threshold reached notification messages 780 to identify congestion at the queues of the uplink manager 727, the PNIC 730, and the port of the virtual switch 725 represented by chokepoint 935. The threshold reached notification messages 780 for VNIC 922 are sent from congestion notification system message bus 950.

The VNIC 722 is subscribed to receive congestion notifications about chokepoints 735 (actually to the process, e.g., the virtual switch that manages the queue represented by chokepoint 735), 740, and 745. Accordingly, the VNIC 722 receives threshold reached notification messages 780 to identify congestion at the queues of the uplink manager 727, the PNIC 730, and the port of the virtual switch 725 represented by chokepoint 735. The threshold reached notification messages 780 for VNIC 722 are sent from congestion notification system message bus 750.

As described with respect to FIG. 7, when the queue of a particular component reaches the threshold fullness, the component sends a congestion notification message 770 to the higher layer component (here, VNICs 722 through a congestion notification system message bus 750 and the VNIC 922 through a congestion notification system message bus 950). The congestion notification message 770 of some embodiments includes more data than the fact that the threshold has been reached. For example, the congestion notification message 770 of some embodiments includes the actual percentage of congestion (e.g., if the threshold level is 70%, but the queue is actually 85% full, the congestion notification message 770 will indicate that the congestion level is 85%). The congestion notification message 770 of some embodiments includes the source of the packets (e.g., the source IP address and/or MAC address of the packet) that are congesting the queue. In some embodiments, the identified source is the last packet to enter the queue. In other embodiments, the identified source is based on a most common source of a sampling of packets (e.g., a fraction or all of the packets) in the queue. In some embodiments, by the congestion notification system identifying the source of the congestion, the higher component can selectively reduce the rate of sending packets only of those slow down packets from the source of the congestion, without reducing the rates of sending packets from other sources. In some embodiments, the congestion notification messages 770 include other data relating to one or more packets in the queue (e.g., the destination, size, a hash of the contents, etc.).

V. Congestion Notification System Processes

In some embodiments, various processes are implemented by components of the computer virtualization networking stack in order to set thresholds at which lower layer components should provide congestion notification messages and in order to properly respond to congestion by notifying higher layer components. In some embodiments, a particular component both receives congestion notifications from (relatively) lower layer components and sends congestion notifications to (relatively) higher layer components.

Figure 10:
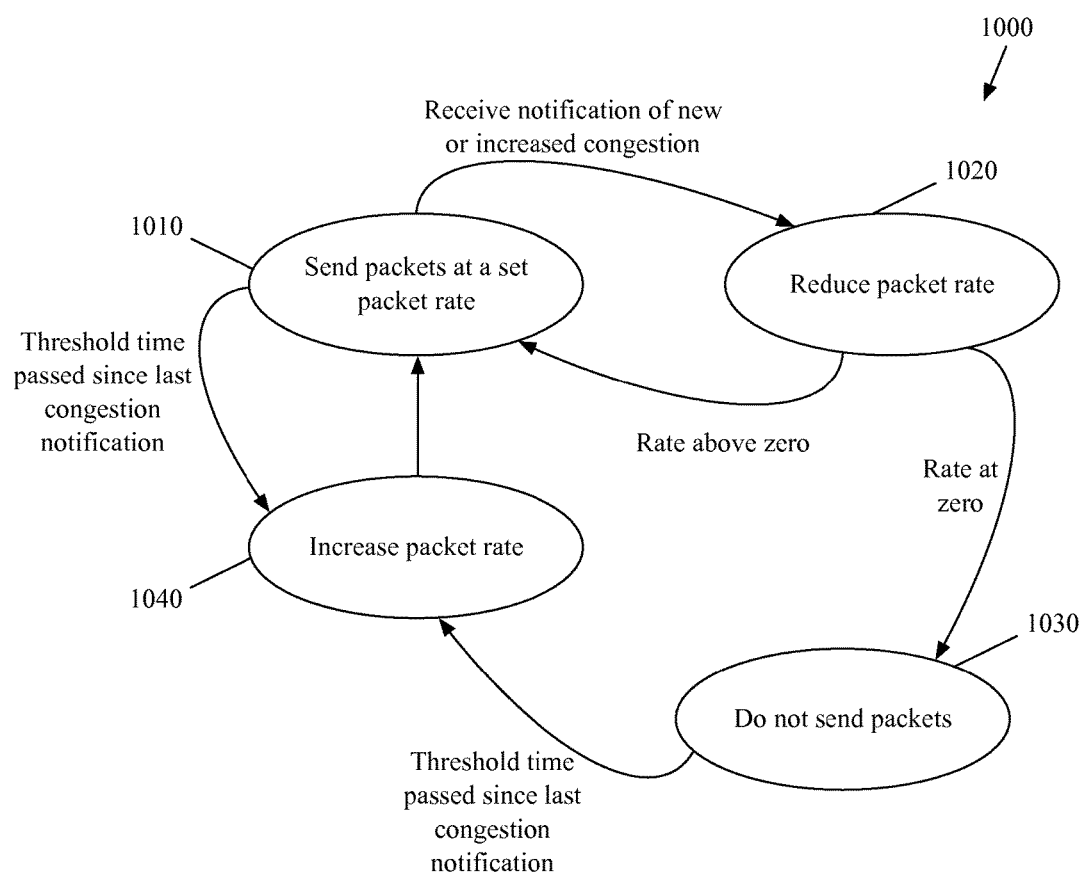
FIG. 10 conceptually illustrates a state diagram for a higher layer component receiving congestion notification messages from lower layer components.

FIG. 10 conceptually illustrates a state diagram 1000 for a higher layer component receiving congestion notification messages from lower layer components. In some embodiments, the higher layer component starts in state 1010. In state 1010, the component sends data packets at a set rate (in some embodiments, the rate may be set to "as fast as possible" or to a particular sending rate) to the lower layer components of a computer virtualization networking stack toward a network. For example, in FIG. 5, VNIC 343 sends data packets 512 toward the network through the virtual switch. In some embodiments, the higher layer component initially sends these data packets to the lower layer components as fast as it can, pending later receipt of a congestion notification.

In order to receive congestion notifications from a lower network layer, the higher layer component subscribes to receive congestion notifications about a lower layer, queue managing, component. A threshold congestion setting of the chokepoint (e.g., a default setting or a setting set in the configuration of the component managing the queue) determines what level of congestion (i.e., fullness of the queue managed by the queue managing component) will result in a congestion notification message being sent to the congestion notification system message bus.

The higher layer component continues to send packets at the set rate until it receives a notification of new or increased congestion (e.g., a threshold reached notification message or a congestion notification message from a lower layer component, either directly or through a message bus). When the higher layer component receives such a notification, the state transitions to state 1020, which reduces the packet rate (assuming the packet rate is not already sufficiently low as a result of previous congestion notification messages). If the rate is above zero, the higher layer component then transitions back to state 1010 and continues to send packets at the new, reduced, rate. In some embodiments, the reduced packet rate could be zero, in which case the higher layer component transitions to state 1030 and stops sending packets until a threshold time has passed since the last congestion notification.

When a threshold time has passed since the last received congestion notification, the higher layer component transitions from state 1010 (or 1030) to state 1040. In state 1040, the higher layer component increases the packet sending rate and returns to state 1010.

In some embodiments, the packet rate is lowered by a particular amount each time a congestion notification is received. In some embodiments, the rate of sending packets from the higher layer component is lowered to zero when the congestion notification is received and the packets are stored in a queue of the higher layer component (see, e.g., FIG. 6).

In other embodiments, the higher layer component rejects requests from even higher layer components to generate data packets (e.g., a VNIC or TCP/IP stack will slow down generation or not generate packets for a packet source while there is congestion in the lower layer components). In some embodiments, the packet sending rate is lowered by an amount based on the level of congestion. For example, the packet sending rate could be half of a maximum rate when the congestion in a queue is 70% full, a quarter of maximum rate when the congestion in the queue is 85% full, and zero when the congestion in the queue is 100% full.

Figure 11:
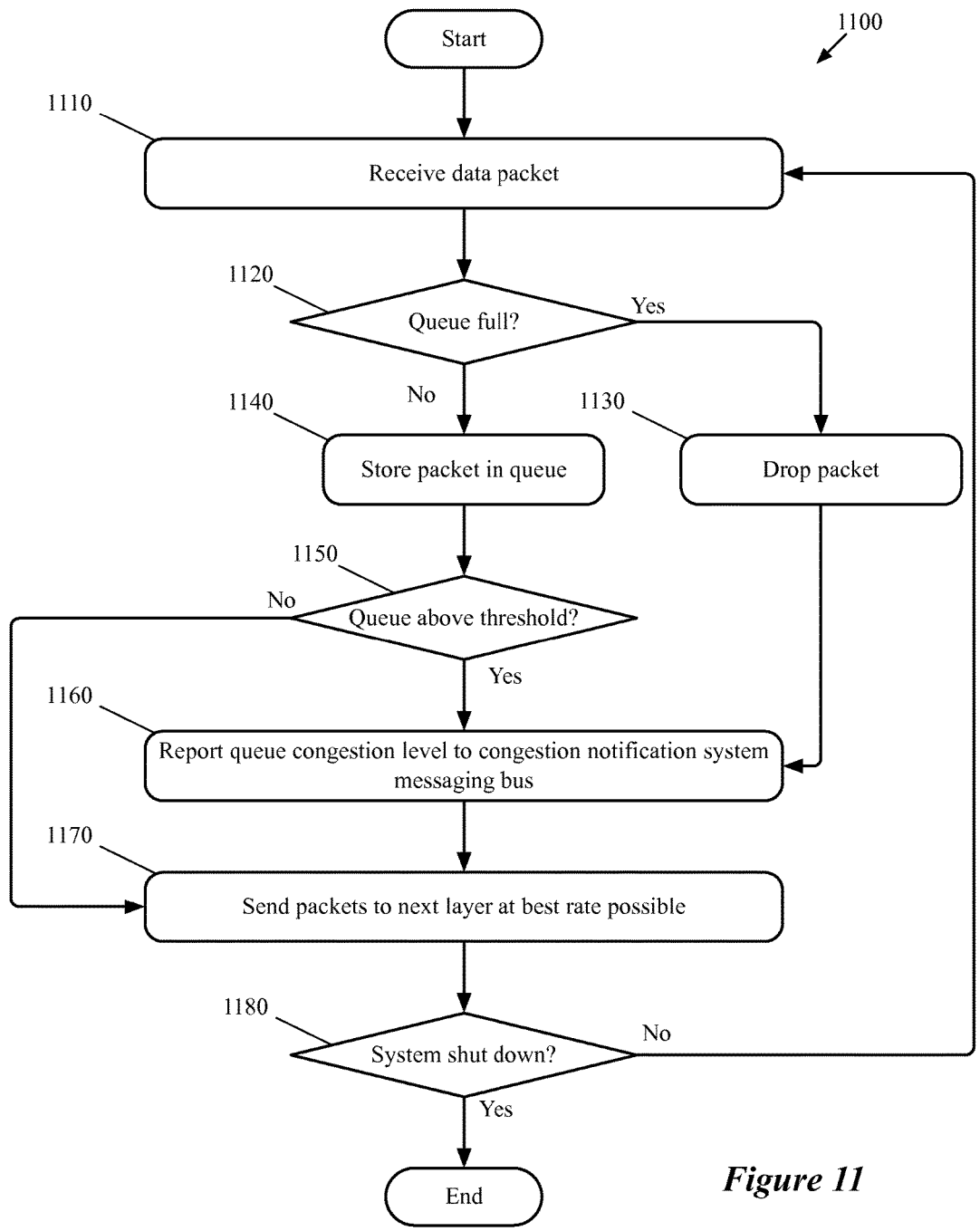
FIG. 11 conceptually illustrates a process of some embodiments for a lower layer component to report congestion to a higher layer component.

FIG. 11 conceptually illustrates a process 1100 of some embodiments for a lower layer component to report congestion to a higher layer component. The process 1100 receives (at 1110) a data packet. For example, in FIG. 5, the uplink manager 350 receives data packets 514 from virtual switch 344. The process 1100 then determines (at 1120) whether the queue of the lower layer component is full. When the queue is full, the process 1100 drops (at 1130) the newly arrived packets and proceeds to operation 1160. When the queue is not full, the process 1100 stores (at 1140) the packets in the queue. For example, in FIG. 5, the uplink manager 350 stores the data packets 514 in the uplink queue. In some embodiments, multiple packets arrive in a short amount of time when a queue is almost full. In such a situation, it is possible for the packets to "overflow" the queue. In some embodiments, when a queue overflows, some of the arriving packets are stored in the space left in the queue and the rest of the arriving packets are dropped.

After operation 1140, the process 1100 determines (at 1150) whether the queue is above the threshold congestion setting for sending congestion notification messages. When the queue is not above the threshold, the process 1100 proceeds to operation 1170 to send out packets. When the queue is above the threshold, the process reports the queue congestion level (i.e., how full the queue is) to the higher layer component through a congestion notification system message bus. The process 1100 then sends (at 1170) packets to the next lower layer component at the best possible rate. In some embodiments, the best possible rate is the highest rate at which the next lower component will accept packets. In other embodiments, the best possible rate is lowered in response to congestion notification messages from even lower layer components (e.g., in some embodiments, a PNIC sends congestion notification messages to an uplink manager, either instead of, or in addition to the uplink manager sending congestion notification messages to a VNIC). In some embodiments, the best possible rate under some circumstances (e.g., when there is congestion below, or when the next component not accepting packets) may be zero, in which case the process 1100 does not send out packets in operation 1170.

The process 1100 then determines (at 1180) whether the system has been shut down (e.g., after receiving a shutdown command). When the system has not been shut down, the process 1100 returns to operation 1110 to receive the next packet. When the system has been shut down, the process 1100 ends.

VI. Dropping Packets of Large Data Senders

In the above-described embodiments, the process (e.g., the process that implements a VNIC) that receives the congestion notification message reduces the rate of sending packets to lower layer components. In some embodiments, reducing the rate of sending packets includes dropping some packets (e.g., when there is no VNIC queue or the VNIC queue is too small to store all the incoming packets until the congestion in the lower layer components is relieved). When multiple data flows (e.g., data packets with matching source IP, destination IP, source port, destination port, and communications protocol) are being sent out of the host through a particular PNIC, it is possible for one data flow to consume a larger fraction of the PNIC queue than other data flows (e.g., by sending more data in a particular period of time). Data flows that consume relatively more of the PNIC queue are referred to herein as "larger flows", while data flows that consume relatively less of the PNIC queue are referred to herein as "smaller flows". In some embodiments, the higher layer components (e.g., VNIC processes) that drop the packets selectively drop a higher percentage of the packets from larger flows than from the smaller flows. However, in some embodiments, the process that drops the packets does not store a record of how much data has been produced by each flow, sent by each flow, or is taking up space in the PNIC queue.

The PNIC of some embodiments sends out data in relatively small data segments (e.g., about 1500 bytes per segment in some embodiments). Space in the PNIC queue of some embodiments is limited to storing a particular number of data segments (e.g., 500 data segments). The source of a packet of data may send packets of data much larger than the PNIC's segment size. For example, in some embodiments, a TCP/IP stack produces data in packets of about 65 kB. These large packets are then broken down (by processes that operate between the TCP/IP stack and the PNIC or at the PNIC) into data segments for transmission from the PNIC to a network outside the host. In order to estimate which data flows are consuming the most queue space in the PNIC, some embodiments provide a source of data packets (e.g., a process implementing a TCP/IP stack) that sends a usage indicator with each packet to identify how many unacknowledged packets are outstanding for the data flow associated with that packet. The dropping process (e.g., the VNIC process) uses these usage indicators to determine which packets to drop.

A. Dropping Packets from Larger Flows

Figure 12:
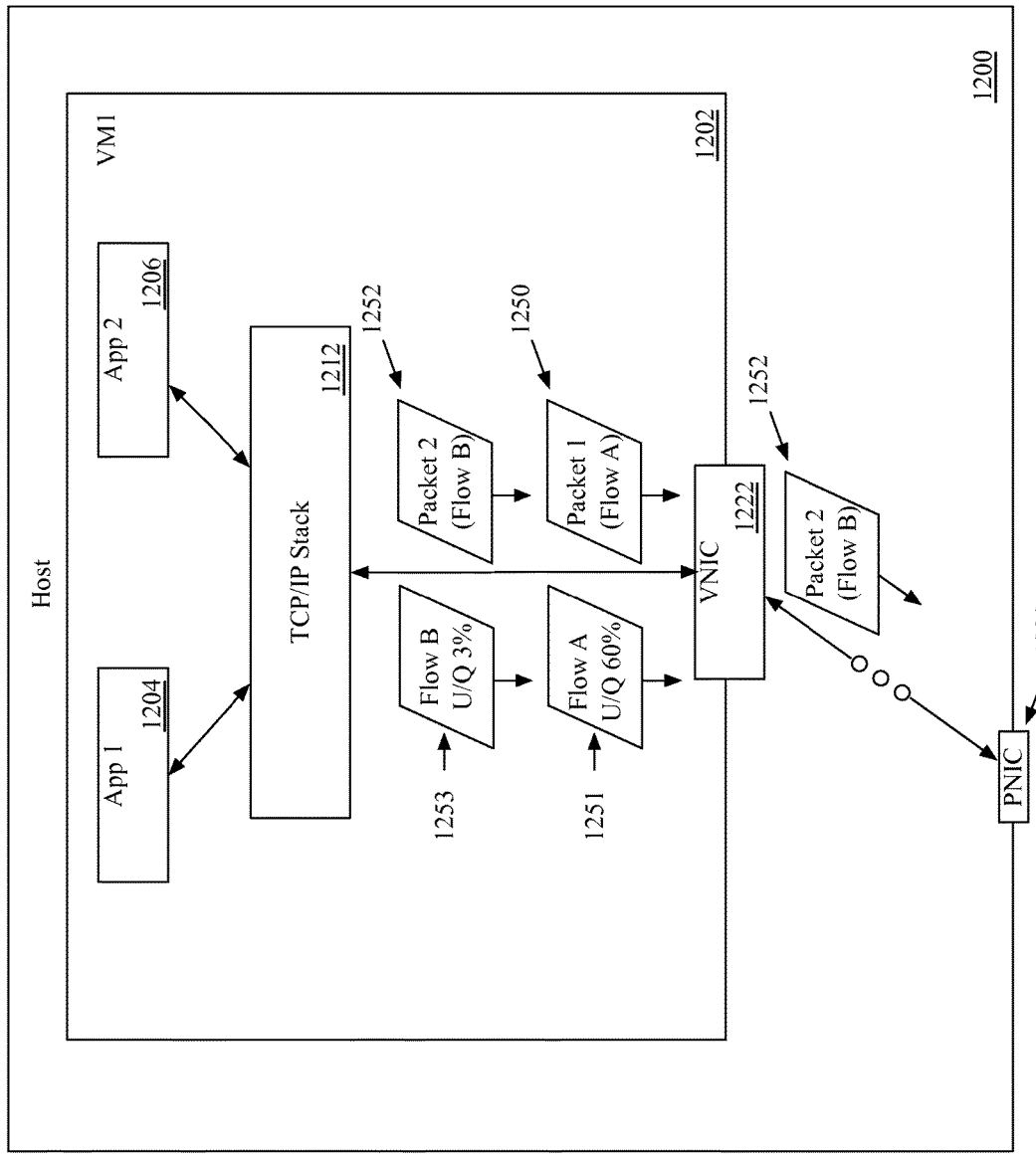
FIG. 12 illustrates a system of some embodiments for determining which packets to drop.

FIG. 12 illustrates a system of some embodiments for determining which packets to drop. The figure includes host machine 1200, virtual machine 1202, applications 1204 and 1206, TCP/IP stack 1212, VNIC 1222, PNIC 1230, and data packets 1250 and 1252 with respective usage indicators 1251 and 1253. The host machine 1200 is a physical computer that implements the virtual machines including virtual machine 1202 and other virtual machines (not shown). The virtual machine 1202 is a simulation of an independent computer running applications 1204 and 1206. The applications 1204 and 1206 send data to other virtual or physical machines through a TCP/IP stack of some embodiments that translates the data into large packets (e.g., 65 kilobyte (kB) packets), such as packets 1250 and 1252, and sends the packets to VNIC 1222. The VNIC 1222 of some embodiments sends the packets of data to PNIC 1230. In some embodiments, the packets of data are routed and/or adjusted by other modules between the VNIC 1222 and the PNIC 1230. In some embodiments, these modules are similar to or identical to the virtual switch 344 and uplink manager 350 of FIG. 3. In some embodiments, the uplink manager or some other final network stack layer is implemented as part of the PNIC 1230. In some embodiments, when a packet of data reaches the PNIC 1230, the packet is divided into smaller segments of data (e.g., 1500 bytes per segment). The segments are then sent out of the host machine through the PNIC 1230.

The PNIC 1230 has a limited capacity to store packets (e.g., in a PNIC queue). In some embodiments, the PNIC 1230 can store up to a set number of segments (e.g., 500). When the PNIC 1230 reaches its full capacity, it stops accepting more packets until enough segments have been sent to leave space in the queue for segments derived from a new packet. In some embodiments, when the queue of PNIC 1230 is full beyond a particular threshold level, the PNIC 1230 sends a congestion notification message to any VNICs that send data to that PNIC (e.g., as described with respect to FIGS. 6-9). In the previous sections, the VNIC was described as dropping packets after receiving a congestion notification, but not as preferentially dropping particular packets. However, in some embodiments, the VNIC 1222 preferentially drops packets coming from the flows that are taxing the resources of the PNIC (e.g., flows are using up the most space in the PNIC queue).

The VNIC 1222 of some embodiments does not directly measure which flows are using the most queue space of the PNIC 1230. In some such embodiments, the module implementing the TCP/IP stack 1212 keeps track of how much data has been sent out for each flow (e.g., a particular flow being all data with the same source IP address, destination IP address, source port, destination port, and protocol) that have not yet received acknowledgement messages (e.g., messages from the destination computer or device acknowledging delivery of the data at the destination IP and port address of the packet). A packet for which (1) an acknowledgement message has not been received and (2) the TCP/IP module has not identified as lost is described herein as an "unacknowledged packet". Data from such a packet may be described herein as "unacknowledged data" or as "in flight." In some embodiments, a packet is identified as lost when either (1) the TCP/IP stack receives a notification that the packet has been dropped (e.g., from the VNIC), or (2) when a threshold time has elapsed, since the TCP/IP module sent the packet, without receiving an acknowledgement message for the packet.

In some embodiments, the module implementing the TCP/IP stack sends a usage indicator, to the VNIC, with each packet to indicate what proportion of the PNIC queue is represented by the unacknowledged packets. For example, in FIG. 12, packet 1250 is part of Flow A. As indicated by usage indicator 1251, Flow A has enough unacknowledged data to account for 60% of the queue of PNIC 1230. Similarly, packet 1252 is part of Flow B. As indicated by usage indicator 1253, Flow B has enough unacknowledged data to account for 3% of the queue of PNIC 1230. In the first example, if the PNIC 1230 has a queue size of 500 segments of 1500 bytes each, then Flow A represents enough data for 60% of the 500 segments (i.e., 300 segments of 1500 bytes each or a total of 450,000 bytes of data). In the second example, if the PNIC 1230 has a queue size of 500 segments of 1500 bytes each, then Flow B represents enough data for 3% of the 500 segments (i.e., 15 segments of 1500 bytes each or a total of 22,500 bytes of data).

The TCP/IP stack is provided with the PNIC queue size as configured constant, in some embodiments. Specifically, when an uplink is created by joining a PNIC to a virtual switch, some embodiments establish the queue size for the uplink at this time by reading the queue size from the system configuration. If the queue size is modified, some embodiments pass this information to the TCP/IP stack so it can use the new value to calculate the usage indicator.

In some embodiments, the value is based on the amount of unacknowledged data, even though not all of the unacknowledged data is necessarily occupying space in the queue of the PNIC. In some cases, data may be unacknowledged because either the segments containing the data are stalled somewhere on the network, or because the acknowledgement messages are stalled (e.g., either on the network or in the host). For example, if the PNIC 1230 has sent data from a particular flow, then that data is no longer in the PNIC's queue, but the data may remain unacknowledged due to external conditions (e.g., a slow system at the destination, long round trip to the destination, etc.). In some circumstances, enough unacknowledged data can be sent to the network by the PNIC that the usage indicator indicates greater than 100% usage of the PNIC queue.

The VNIC 1222 of some embodiments determines whether or not to drop a particular packet sent from the TCP/IP stack 1212. Various embodiments use various calculations to determine whether to drop a particular packet during periods of high congestions. In some embodiments, the usage indicator corresponding to a particular packet is compared to a threshold level. The VNIC 1222 of such embodiments drops packets whose corresponding usage indicator is higher than that threshold, while sending packets whose corresponding usage indicator is lower than the threshold on toward the PNIC 1230. For example, the VNIC 1222 compares usage indicator 1251 (60%) to a threshold value (e.g., 40%). The usage indicator 1251 value (60%) is greater than a 40% threshold value, so the VNIC 1222 makes a decision to drop the corresponding packet 1250. The VNIC 1222 also compares usage indicator 1253 (3%) to a threshold value (e.g., 40%). The usage indicator 1253 is less than the 40% threshold value, so the VNIC 1222 makes a decision to send the corresponding packet 1252 of FIG. 12 on toward the PNIC 1230, as shown in FIG. 12. In some embodiments, when the VNIC 1222 drops a packet, the VNIC 1222 also sends an error message to the TCP/IP stack 1212 to indicate that the packet has been dropped. Although the above example uses the same threshold value (40%) when comparing packets from both flows, in some embodiments, the threshold values are not the same for each flow. For example, some flows may be designated as having higher priorities than others and such flows may have higher threshold values than the lower priority flows. In some embodiments, the threshold value for a particular flow is not constant (e.g., threshold values in various embodiments are based on one or more of, the congestion level of the PNIC queue, how many packets from a particular flow have been dropped recently, the type of application producing the packets, or any other reason for having non-constant threshold values).

Rather than a one-to-one correspondence between a VNIC and a PNIC, in some embodiments the PNICs operate in NIC-teams, with outgoing packets sent through the teaming layer prior to the uplink and PNIC. In this case, the VNIC may be notified of congestion when one of the PNIC queues is congested, and will begin dropping packets heading towards that PNIC. However, the VNIC will not be aware as to which flows are sent to the congested PNIC and which flows are sent to the other PNICs in the team, and therefore packets for all flows sent to the NIC-team will be subject to potentially being dropped by the VNIC. In this case, the queue size used for calculating the usage indicator will be that of the congested PNIC queue in some embodiments, known to the TCP/IP stack as described above. Some embodiments, though, may include state-sharing between the teaming layer and the VNIC, to indicate which flows are being sent to the PNIC with the congested queue and which flows are being sent to the other PNICs in the team.

B. Probabilistic Packet Dropping

The VNIC 1222 of the embodiment illustrated in FIG. 12, drops packets based on threshold levels. In such an embodiment, packets from a flow with a higher than threshold usage of the PNIC queue will be dropped until the proportion of unacknowledged packets drops below the threshold level or the threshold level rises to exceed the proportion of unacknowledged packets. The percentage of unacknowledged packets drops in some embodiments either when the TCP/IP stack receives an acknowledgement message for the outstanding packets or when the TCP/IP stack determines that those packets are permanently lost such as when the acknowledgement is not received within a threshold period (such packets are sometimes referred to as "timed out").

Figure 13A:
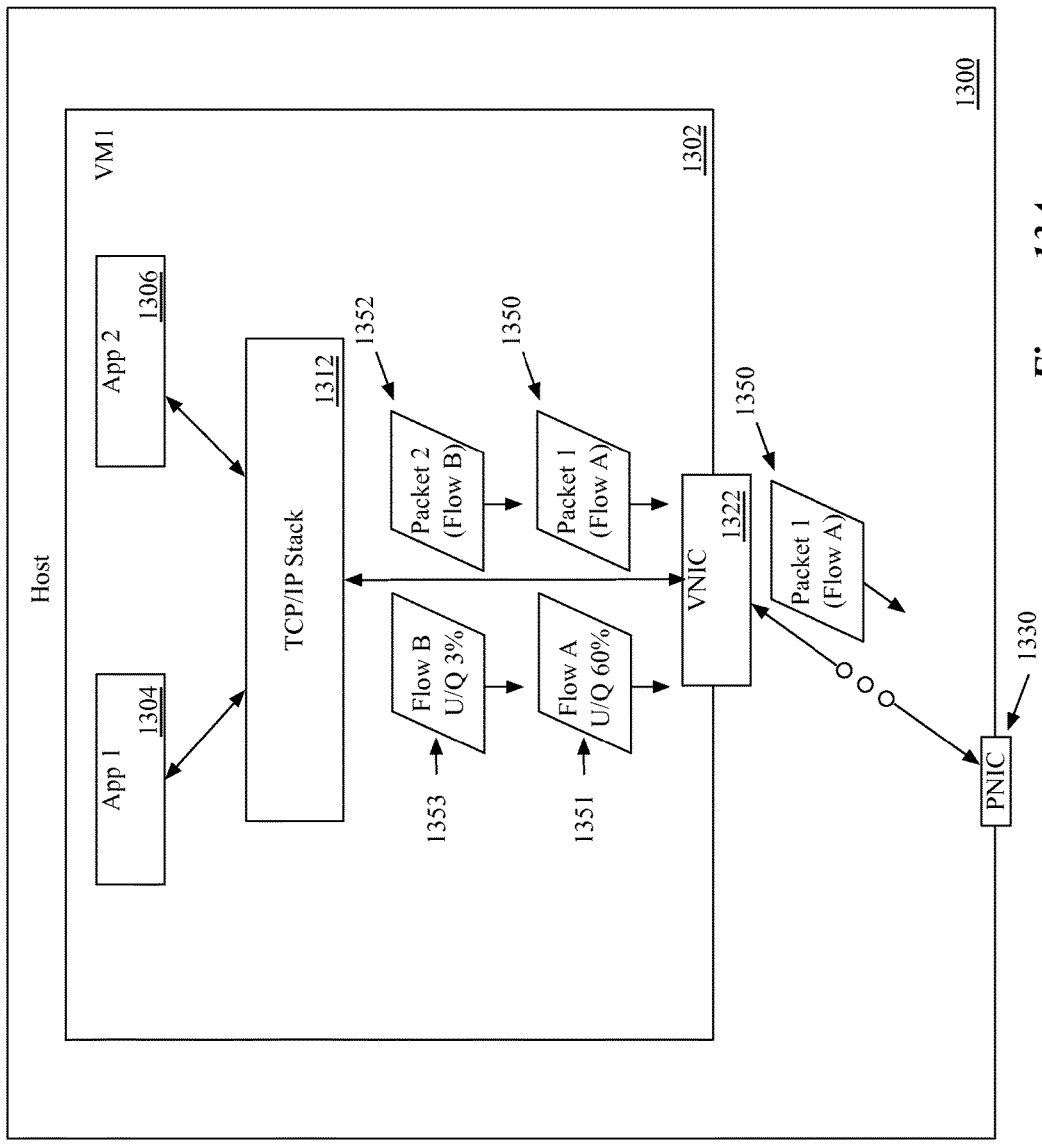
FIGS. 13A and 13B illustrate a system in which a VNIC drops packets on a probabilistic basis.
Figure 13B:
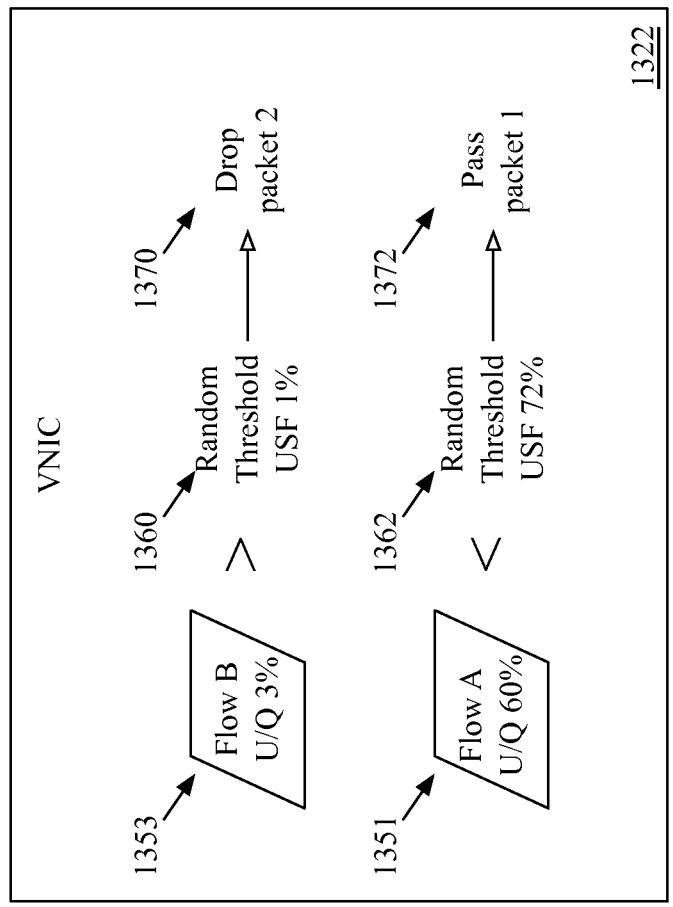

In some embodiments, the VNIC uses a probabilistic determination to select packets to be dropped. In some such embodiments, the VNIC drops packets with a probability in proportion to how large a percentage of the PNIC queue the flow corresponding to the packet occupies. For example, in some such embodiments the VNIC will drop X % of the packets (on average) of a flow whose usage indicator is X %. FIGS. 13A and 13B illustrate a system in which the VNIC drops packets on a probabilistic basis. FIG. 13A illustrates a system of some embodiments for determining which packets to drop. The figure includes host machine 1300, virtual machine 1302, applications 1304 and 1306, TCP/IP stack 1312, VNIC 1322, PNIC 1330, and data packets 1350 and 1352 with respective usage indicators 1351 and 1353. The host machine 1300 is a physical computer that implements the virtual machines including virtual machine 1302 and other virtual machines (not shown). The virtual machine 1302 is a simulation of an independent computer running applications 1304 and 1306. The applications 1304 and 1306 send data to other virtual or actual computers through a TCP/IP stack of some embodiments that translates the data into large packets (e.g., 65 kilobyte (kB) packets), such as packets 1350 and 1352, and sends the packets to VNIC 1322. The VNIC 1322 of some embodiments sends the packets of data to PNIC 1330. In some embodiments, the packets of data are routed and/or adjusted by other modules between the VNIC 1322 and the PNIC 1330. In some embodiments, these modules are similar to or identical to the virtual switch 344 and uplink manager 350 of FIG. 3. In some embodiments, the uplink manager or some other final network stack layer is implemented as part of the PNIC 1330. In some embodiments, when a packet of data reaches the PNIC 1330, the packet is divided into smaller segments of data (e.g., 1500 bytes per segment). The segments are then sent out of the host machine through the PNIC 1330.

In the previous section, the VNIC was described as dropping any packets from a flow with a proportion of unacknowledged data corresponding to a threshold percentage of the PNIC queue. In some embodiments, the VNIC 1322 uses a random threshold for each packet and therefore drops a random set of packets coming from the flows that are taxing the resources of the PNIC in proportion to how large the unacknowledged data of those flows are compared to the PNIC queue size.

As with VNIC 1222 of FIG. 12, the VNIC 1322 of FIG. 13A does not directly measure which flows are using the most queue space of the PNIC 1330. In some such embodiments, the module implementing the TCP/IP stack 1312 keeps track of how much data has been sent out for each flow that have not yet received acknowledgement messages. In some embodiments, the module implementing the TCP/IP stack 1312 sends a usage indicator, to the VNIC 1322, with each packet to indicate what proportion of the PNIC queue is represented by the unacknowledged packets.

In FIG. 13A, packet 1350 belongs to Flow A. As indicated by usage indicator 1351, Flow A has enough unacknowledged data to account for 60% of the queue of PNIC 1330. Similarly, packet 1352 belongs to Flow B. As indicated by usage indicator 1353, Flow B has enough unacknowledged data to account for 3% of the queue of PNIC 1330. In the first example, if the PNIC 1330 has a queue size of 500 segments of 1500 bytes each, then Flow A represents enough data for 60% of the 500 segments. In the second example, if the PNIC 1330 has a queue size of 500 segments of 1500 bytes each, then Flow B represents enough data for 3% of the 500 segments.

The VNIC 1322 of some embodiments determines whether or not to drop a particular packet sent from the TCP/IP stack 1312. In the embodiments of FIGS. 13A-13B, the usage indicator corresponding to a particular packet is compared to a randomly generated threshold level (e.g., using a different random threshold level for each packet). The VNIC 1322 of such embodiments drops packets whose corresponding usage indicator is higher than the random threshold for the corresponding packet, while sending packets whose corresponding usage indicator is lower than the random threshold for the corresponding packet on toward the PNIC 1330. FIG. 13B conceptually illustrates such a calculation by VNIC 1322. In FIG. 13B, the VNIC 1322 compares usage indicator 1351 (60%) to a randomly generated threshold value 1362 (72%). The usage indicator 1351 is less than the randomly generated threshold value 1362, so the VNIC 1322 makes decision 1372 to send the corresponding packet 1350 of FIG. 13A on toward the PNIC 1330. The VNIC 1322 also compares usage indicator 1353 (3%) to the different random threshold value 1360 (1%). The usage indicator 1353 is greater than the threshold value 1360, so the VNIC 1322 makes decision 1370 to drop the corresponding packet 1352 of FIG. 13A. One of ordinary skill in the art will understand that although the illustrated example shows a scenario in which the VNIC sends on a packet of a larger flow and drops a packet of a smaller flow (due to the random threshold levels), the VNIC is nonetheless more likely to send on a particular packet from a smaller flow than send on a packet from a larger flow. Furthermore, one of ordinary skill in the art will understand that the numbers indicated as "random" will be generated in some embodiments by a pseudo-random number generator. In a similar manner to VNIC 1222 of FIG. 12, in some embodiments, when the VNIC 1322 drops a packet, the VNIC 1322 also sends an error message to the TCP/IP stack 1312 to indicate that the packet has been dropped.

C. TCP/IP Stack and VNIC Processes

Figure 14:
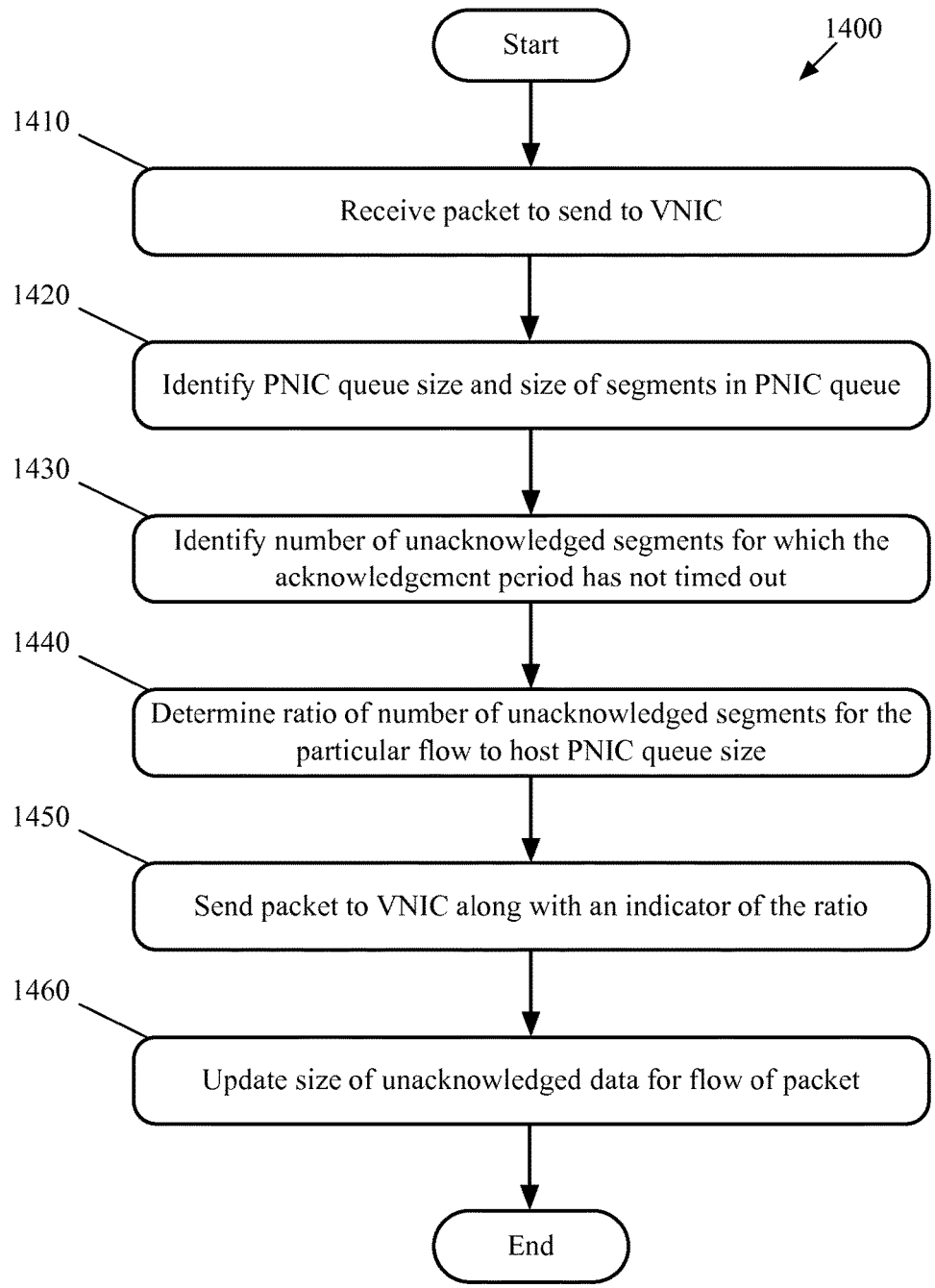
FIG. 14 conceptually illustrates a process of some embodiments for sending packets and usage indicators from a TCP/IP module.

Various embodiments of the packet dropping system use various different processes for sending usage indicators between the TCP/IP module and the VNIC module. FIG. 14 conceptually illustrates a process 1400 of some embodiments for sending a packet and a corresponding usage indicator from a higher layer component (e.g., a TCP/IP module) to a lower layer component (e.g., a VNIC) that determines whether to drop data packets. The process 1400 receives (at 1410) a data packet to send to the VNIC. In some embodiments, the higher layer and lower layer components are both processes implemented as part of a virtual machine and the data comes from an application running on that virtual machine. In some embodiments, the higher and lower layer components are on a kernel of a host machine and the data packet comes from processes that also run on the kernel of the host machine. Although the process 1400 is described as receiving a packet, in some embodiments, the data packet received by the higher layer component is in any of several formats including, but not limited to a stream of data, multiple smaller packets of data, or a packet of data larger than the higher level is capable of sending, which will be broken up by the higher layer component into smaller packets for sending to the lower layer component.

The process 1400 identifies (at 1420) a size of the queue of a PNIC of the host and the size of segments in the PNIC queue. In some embodiments, the host PNIC size is provided from configuration data in terms of the number of segments the PNIC queue can hold. The TCP/IP stack is provided with the PNIC queue size as configured constant, in some embodiments. Specifically, when an uplink is created by joining a PNIC to a virtual switch, some embodiments establish the queue size for the uplink at this time by reading the queue size from the system configuration. If the queue size is modified, some embodiments pass this information to the TCP/IP stack so it can use the new value to calculate the usage indicator.

The maximum size of the segments in the PNIC queue is fixed in some embodiments (e.g., in some embodiments, the maximum size of each segment is 1500 bytes). Although the process 1400 is described as identifying the PNIC queue size and segment size after receiving the data packets, in some embodiments these values are fixed, or only change infrequently. Accordingly, in such embodiments, the higher layer component (e.g., the TCP/IP module) determines these values once (or infrequently) rather than identifying them separately for each packet.

The process 1400 then identifies (at 1430) how many PNIC queue segments are represented by unacknowledged data for a flow of a packet that the TCP/IP module is about to send to a VNIC. In some embodiments, the process 1400 identifies this number of segments by keeping track of the total size of the data in unacknowledged packets outstanding for each flow (e.g., updating unacknowledged data sizes in operation 1470, below). Therefore, the TCP/IP module has both the size of the unacknowledged data and the segment size for PNIC segments. Accordingly, such embodiments identify the number of outstanding segments by dividing the amount of unacknowledged data by the previously identified segment size of the PNIC segments.

The process 1400 determines (at 1440) the ratio of unacknowledged segments in a particular flow (i.e., a flow of a packet that the TCP/IP module is about to send to the VNIC) to the size of the PNIC queue. In some embodiments, this ratio is calculated as a fraction of the total queue (e.g., 0.1, 0.6, 0.99, etc.). In other embodiments, this ratio is calculated as a percentage of the total queue (e.g., 10%, 60%, 99%, etc.). In some embodiments, this ratio is calculated based on the amount of data previously sent in a particular flow, and not on the amount of data in the packet that the TCP/IP module is about to send. In other embodiments, the amount of data in the packet about to be sent is included in the ratio.

The process 1400 sends (at 1450) a packet to the VNIC (i.e., the next packet in the flow for which the TCP/IP module calculated the ratio). In some embodiments, each packet is a fixed size (e.g., 65 kB). In other embodiments, the packets are a variable size (e.g., a size dependent on how much data needs to be sent, up to a maximum size in each packet). Along with the packet, the process 1400 sends (also at 1450) an indicator of the ratio of unacknowledged segments to host PNIC queue size. In various embodiments, this indicator is a percentage, a fraction, or some other number based on the calculated ratio. In various different embodiments, the indicator might be sent before the packet, after the packet, or prepended, appended, or otherwise sent as part of the packet itself. Furthermore, in other embodiments, the TCP/IP module might update a table with a usage indicator value for the flow, which the VNIC reads when determining whether to drop the packet.

In addition, some embodiments may mark a packet as non-droppable. Specifically, the TCP/IP module may mark certain important types of packets as non-droppable, to prevent the VNIC from dropping the packet even if the packet belongs to a large flow (e.g., packets that are part of a handshake protocol for establishing a connection or keeping a connection alive).

The process 1400 then updates (at 1460) the size of the unacknowledged data flow for the packet. In some embodiments, the updated value is based on adding the size of the outgoing packet data to a previously identified size of unacknowledged data. In some embodiments, in addition to adding outgoing packets to the unacknowledged data size, the process also reduces the unacknowledged data size based on error messages received from the VNIC indicating that a packet has been dropped and/or based on previously sent packets "timing out" (i.e., remaining unacknowledged for more than a threshold amount of time). The process 1400 then ends with respect to that packet. One of ordinary skill in the art will understand that the process 1400 will be performed multiple times in the course of sending multiple packets.

Figure 15:
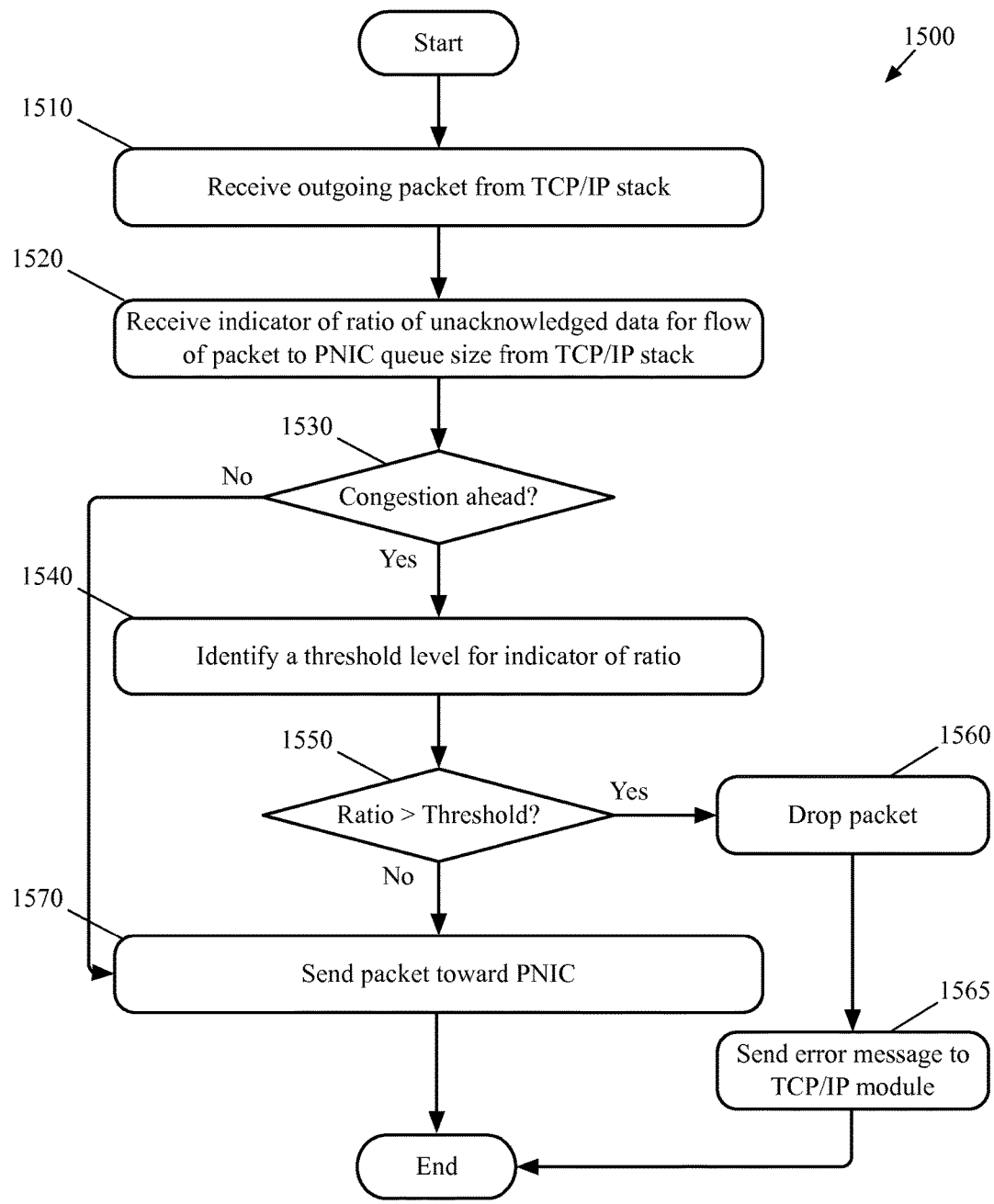
FIG. 15 conceptually illustrates a process 1500 of some embodiments for determining whether to drop packets.

In some embodiments, a lower layer component (e.g., a VNIC) receives packets and identifying data from a higher layer component (e.g., a TCP/IP module) and determines whether to drop the packets. FIG. 15 conceptually illustrates a process 1500 of some embodiments for determining whether to drop packets. The process 1500 receives (at 1510) an outgoing packet from the TCP/IP module. As mentioned above, the packet may be of a fixed size (e.g., 65 kB) or a variable size (e.g., between a minimum size and 65 kB). Along with the packet, the process receives (at 1520) an indicator of the ratio of unacknowledged data for the flow of the received packet to the size of the queue of the PNIC. As mentioned above, in various embodiments, the indicator may be in various mathematical formats (e.g., decimalized fraction, percentage, or other mathematical value based on the calculated ratio). The indicator may be received before, after, or as part of the packet in various embodiments.

The process 1500 determines (at 1530) whether there is congestion ahead. When there is no congestion ahead, no need exists to drop packets. Accordingly, in that case, the process 1500 sends (at 1570) the packet on toward the PNIC (e.g., through the layers of components identified in FIG. 3). In some embodiments, the VNIC divides the packet into segments before sending the data in the packet toward the PNIC. In other embodiments, the VNIC sends the entire packet, which will be divided before or at the PNIC.

When there is congestion ahead (e.g., as indicated by a congestion notification message as described in FIGS. 1-10), the process 1500 identifies (at 1540) a threshold number representing a threshold level for the indicator of the ratio. In some embodiments, the threshold number is a fixed value. In other embodiments, however the threshold number is determined by generating a random threshold number (e.g., as described with respect to FIGS. 13A and 13B).

The process then determines (at 1550) whether the ratio of unacknowledged segments indicated by the TCP/IP module for the flow of the packet is greater than the threshold. When the ratio is greater than the threshold, the process 1500 drops (at 1560) the packet and sends (at 1565) an error message to the TCP/IP module to indicate that the packet was dropped. The process then ends (for the packet received in operation 1510). When the ratio is less than the threshold (at 1550), the process sends (at 1570) the packet toward the PNIC. The process then ends (for the packet received in operation 1510). One of ordinary skill in the art will understand that the process 1500 is performed multiple times for multiple packets.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
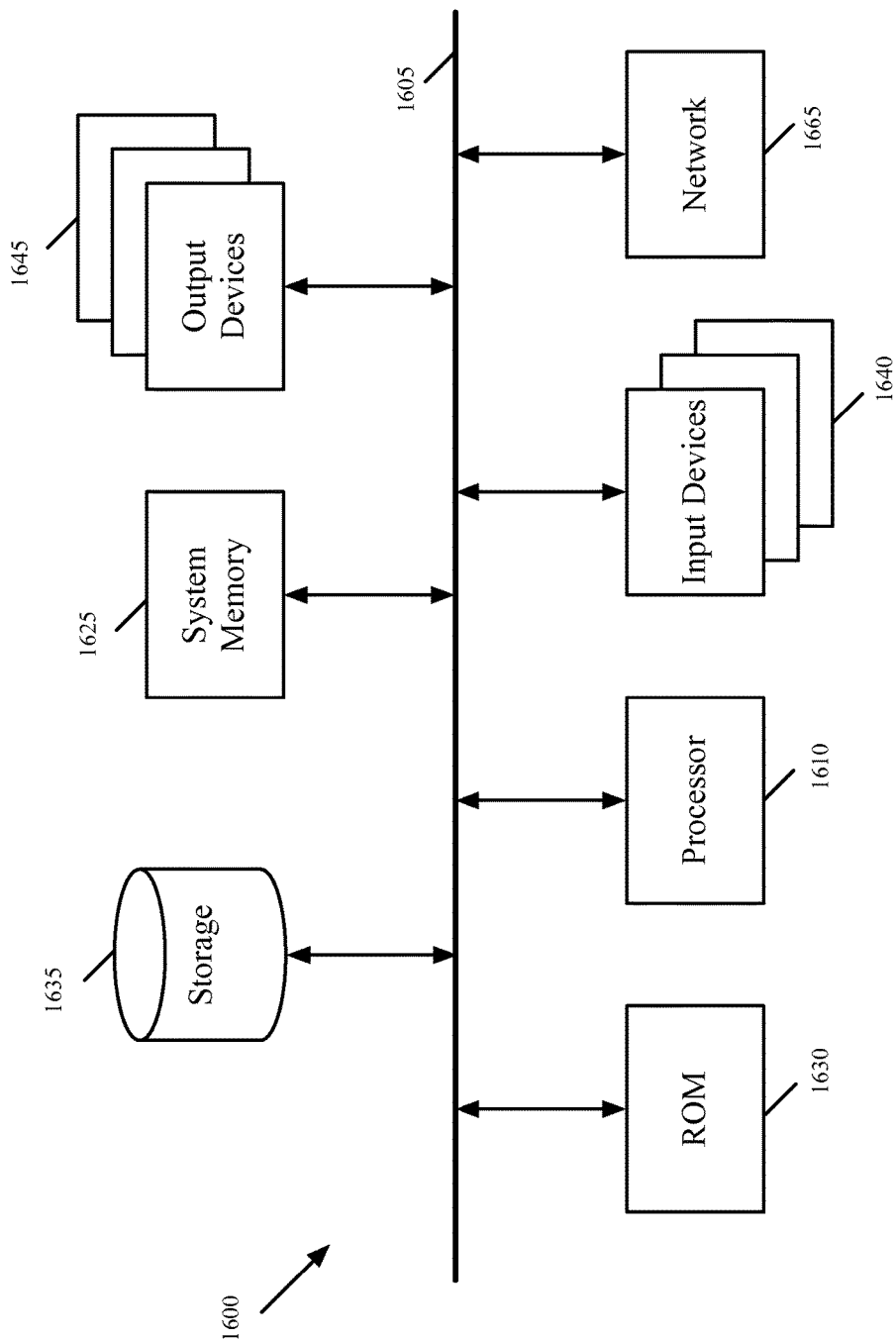
FIG. 16 conceptually illustrates an electronic system with which some embodiments of the invention are implemented.

FIG. 16 conceptually illustrates an electronic system 1600 with which some embodiments of the invention are implemented. The electronic system 1600 can be used to execute any of the control, virtualization, or operating system applications described above. The electronic system 1600 may be a computer (e.g., a desktop computer, personal computer, host machine, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "host", "machine", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, FIGS. 11, 14, and 15 each conceptually illustrates a process. The specific operations of the processes may not be performed in the exact order shown and described. The specific operations may not be performed in one continuous series of operations, and different specific operations may be performed in different embodiments. For example, updating the size of the unacknowledged data for a flow is shown as operation 1470 in FIG. 14. However, such and update could be performed at one or more other stages of the process 1400. Furthermore, any of the described processes could be implemented using several sub-processes, or as part of larger macro processes.

What is claimed is:

1. A method for reducing congestion in a network stack comprising a series of layers, the method comprising:
    at a first layer of the network stack, receiving a data packet from a second layer of the network stack;
    identifying a usage indicator value for a flow to which the data packet belongs;
    when a congestion notification has been received from a third layer of the network stack:
        determining whether to send the data packet based on a comparison of the usage indicator value to a threshold usage value that is specific to the data packet; and
        sending the data packet to a next layer of the network stack only when the usage indicator value is less than the threshold usage value.

2. The method of claim 1, wherein the threshold usage value is generated randomly for each data packet received from the second layer of the network stack.

3. The method of claim 2, wherein the data packet is a first data packet, the flow is a first flow, the threshold usage value is a first threshold usage value, and the usage indicator value is a first usage indicator value, the method further comprising dropping a second data packet belonging to a second flow with a second usage indicator value that is less than the first usage indicator value when a second threshold usage value is lower than the first threshold usage value.

4. The method of claim 1, wherein the usage indicator value for the flow is based on a ratio of (i) unacknowledged data for the flow to which the data packet belongs and (ii) a queue size of a physical network interface card (PNIC).

5. The method of claim 4, wherein the unacknowledged data for the flow comprises packets sent from the network stack for the flow that have not (i) received acknowledgment receipts or (ii) timed out.

6. The method of claim 1, wherein the first layer drops the packet if the usage indicator value for the flow is greater than the threshold usage value for the data packet.

7. The method of claim 1, wherein the first layer is a virtual network interface card (VNIC), the second layer is a TCP/IP stack, and the third layer is a physical network interface card (PNIC).

8. The method of claim 1, wherein the data packet is a first data packet, the flow is a first flow, the usage indicator value is a first usage indicator value, and the threshold usage value is a first threshold usage value, the method further comprising:
    receiving a second data packet from the second layer of the network stack;
    identifying a second usage indicator value for a second flow to which the second data packet belongs;
    when the congestion notification has been received from the third layer of the network stack:
        determining whether to send the second data packet based on a comparison of the second usage indicator value to a second threshold usage value that is specific to the second data packet; and
        sending the second data packet to the next layer of the network stack only when the second usage indicator value is less than the second threshold usage value.

9. The method of claim 8, wherein (i) the first and second threshold usage values are different values and (ii) the first and second flows are the same.

10. The method of claim 1, wherein if no congestion notification has been received, the first layer of the network stack sends the data packet to the next layer of the network stack without comparing the usage indicator value to a threshold usage value.

11. A non-transitory machine readable medium storing a program which when executed by at least one processing unit reduces congestion in a network stack comprising a series of layers, the program comprising sets of instructions for:
- at a first layer of the network stack, receiving a data packet from a second layer of the network stack;
- identifying a usage indicator value for a flow to which the data packet belongs;
- when a congestion notification has been received from a third layer of the network stack:
  - determining whether to send the data packet based on a comparison of the usage indicator value to a threshold usage value that is specific to the data packet; and
  - sending the data packet to a next layer of the network stack only when the usage indicator value is less than the threshold usage value.

12. The non-transitory machine readable medium of claim 11, wherein the threshold usage value is generated randomly for each data packet received from the second layer of the network stack.

13. The non-transitory machine readable medium of claim 12, wherein the data packet is a first data packet, the flow is a first flow, the threshold usage value is a first threshold usage value, and the usage indicator value is a first usage indicator value, wherein the program further comprises a set of instructions for dropping a second data packet belonging to a second flow with a second usage indicator value that is less than the first usage indicator value when a second threshold usage value is lower than the first threshold usage value.

14. The non-transitory machine readable medium of claim 11, wherein the usage indicator value for the flow is based on a ratio of (i) unacknowledged data for the flow to which the data packet belongs and (ii) a queue size of a physical network interface card (PNIC).

15. The non-transitory machine readable medium of claim 14, wherein the unacknowledged data for the flow comprises packets sent from the network stack for the flow that have not (i) received acknowledgment receipts or (ii) timed out.

16. The non-transitory machine readable medium of claim 11, wherein the program further comprises a set of instructions for dropping the packet when the usage indicator value for the flow is greater than the threshold usage value for the data packet.

17. The non-transitory machine readable medium of claim 11, wherein the first layer is a virtual network interface card (VNIC), the second layer is a TCP/IP stack, and the third layer is a physical network interface card (PNIC).

18. The non-transitory machine readable medium of claim 11, wherein the data packet is a first data packet, the flow is a first flow, the usage indicator value is a first usage indicator value, and the threshold usage value is a first threshold usage value, wherein the program further comprises sets of instructions for:
- receiving a second data packet from the second layer of the network stack;
- identifying a second usage indicator value for a second flow to which the second data packet belongs;
- when the congestion notification has been received from the third layer of the network stack:
  - determining whether to send the second data packet based on a comparison of the second usage indicator value to a second threshold usage value that is specific to the second data packet; and
  - sending the second data packet to the next layer of the network stack only when the second usage indicator value is less than the second threshold usage value.

19. The non-transitory machine readable medium of claim 18, wherein (i) the first and second threshold usage values are different values and (ii) the first and second flows are the same.

20. The non-transitory machine readable medium of claim 11, wherein the program further comprises a set of instructions for sending the data packet to the next layer of the network stack without comparing the usage indicator value to a threshold usage value if no congestion notification has been received from the third layer.

* * * * *